US012186746B2

(12) United States Patent
Karunakaran et al.

(10) Patent No.: US 12,186,746 B2
(45) Date of Patent: Jan. 7, 2025

(54) METHODS AND DEVICES FOR MIXING IN A MICROFLUIDIC SYSTEM

(71) Applicant: ILLUMINA, INC., San Diego, CA (US)

(72) Inventors: Aathavan Karunakaran, Berkeley, CA (US); Arnaud Rival, Saint Nazaire les Eymes (FR); Ali Agah, Menlo Park, CA (US); Fabien Abeille, Grenoble (FR); Steven Barnard, Del Mar, CA (US); Craig Ciesla, Mountain View, CA (US); Murali Venkatesan, San Bruno, CA (US); Pargol Gheissari, San Diego, CA (US); Jennifer Wang, San Francisco, CA (US); Dietrich Dehlinger, San Francisco, CA (US)

(73) Assignee: ILLUMINA, INC., San Diego, CA (US)

( * ) Notice: Subject to any disclaimer, the term of this patent is extended or adjusted under 35 U.S.C. 154(b) by 488 days.

(21) Appl. No.: 17/255,819

(22) PCT Filed: Feb. 7, 2020

(86) PCT No.: PCT/IB2020/050979
§ 371 (c)(1),
(2) Date: Dec. 23, 2020

(87) PCT Pub. No.: WO2020/161674
PCT Pub. Date: Aug. 13, 2020

(65) Prior Publication Data
US 2021/0362151 A1    Nov. 25, 2021

Related U.S. Application Data

(60) Provisional application No. 62/803,233, filed on Feb. 8, 2019.

(30) Foreign Application Priority Data

Jun. 24, 2019 (NL) .................................... 2023366

(51) Int. Cl.
*B01L 3/00* (2006.01)
(52) U.S. Cl.
CPC . *B01L 3/502715* (2013.01); *B01L 2300/0645* (2013.01); *B01L 2300/0877* (2013.01);
(Continued)
(58) Field of Classification Search
CPC ....... B01L 3/502715; B01L 2300/0645; B01L 2300/0877; B01L 2300/0896;
(Continued)

(56) References Cited

U.S. PATENT DOCUMENTS 9,594,056 B2 * 3/2017 Fobel .................. B81C 1/00095
2003/0006140 A1 1/2003 Vacca et al.
(Continued)

FOREIGN PATENT DOCUMENTS

CN    103180047 A    6/2013
CN    206404699 U    8/2017
(Continued)

OTHER PUBLICATIONS

Birch et al, "Electrode Materials in Microfluidic Systems for the Processing and Separation of DNA: A Mini Review", Micromachines 2017, 8, 76. (Year: 2017).*
(Continued)

*Primary Examiner* — Dennis White
(74) *Attorney, Agent, or Firm* — MARSHALL, GERSTEIN & BORUN LLP

(57) ABSTRACT

A method for reducing sequencing by synthesis cycle time using a microfluidic device is provided. The microfluidic device comprises a flow cell having an inlet port, an outlet
(Continued)

port, and a flow channel extending between the inlet port and the outlet port, wherein the flow channel receives an analyte of interest and one or more reagents for analyzing and detecting molecules. To aid in the acceleration of the reactions, the microfluidic device comprises a mixing device to increase the rates of diffusion of the reagents from the fluid bulk to an active surface of the flow cell. The mixing device comprises at least one of an electrothermal mixing device, an active mechanical mixing device, and a vibrational mixing device.

21 Claims, 28 Drawing Sheets

(52) U.S. Cl.
CPC ............... *B01L 2300/0896* (2013.01); *B01L 2400/0415* (2013.01); *B01L 2400/06* (2013.01)

(58) Field of Classification Search
CPC ......... B01L 2400/0415; B01L 2400/06; B01L 2400/0445; B01L 3/50273; B01L 2300/0883; B01L 2300/0893; B01L 2300/1833; B01L 2400/0436; B01L 2400/086; B01F 25/43141; B01F 25/43172; B01F 25/431971; B01F 25/4331; B01F 25/50; B01F 31/86; B01F 33/30; B01F 33/3033; B01F 33/3034; B01F 33/3038; B01F 33/45; B01F 25/431; G01N 1/38

See application file for complete search history.

(56) References Cited

U.S. PATENT DOCUMENTS

| | | | |
|---|---|---|---|
| 2008/0056948 | A1 | 3/2008 | Dale et al. |
| 2013/0146459 | A1* | 6/2013 | Bazant ............... B01L 3/502784<br>204/601 |
| 2013/0273640 | A1* | 10/2013 | Krishnan ............ C12N 15/101<br>435/270 |

FOREIGN PATENT DOCUMENTS

| | | | | |
|---|---|---|---|---|
| CN | 108778477 A | 11/2018 | | |
| WO | WO-2007010367 A2 | * 1/2007 | ............... B03C 5/02 |
| WO | WO-2007/107910 A1 | 9/2007 | | |
| WO | WO-2012178095 A1 | * 12/2012 | ............ B01L 3/5085 |

OTHER PUBLICATIONS

Search Report Issued in NL 2023366, dated Mar. 25, 2020.
Communication Relating to the Results of the Partial International Search issued in PCT/IB2020/050979, mailed Jun. 9, 2020.
International Search Report and Written Opinion issued in PCT/IB2020/050979, mailed Jul. 30, 2020.

* cited by examiner

100 um vs 200 um channel height

100um channel height

20Vpp, 20MHz
Incorporation buffer
30s integration time

200um channel height

20Vpp, 20MHz
Incorporation buffer
30s integration time

Electrode width: 200um or 250um radius
Electrode gap: 100um

METHODS AND DEVICES FOR MIXING IN A MICROFLUIDIC SYSTEM

CROSS-REFERENCE TO RELATED APPLICATIONS

This application is a 35 U.S.C. § 371 National Stage of International Patent Application No. PCT/IB2020/050979, filed Feb 7, 2020, which itself claims the benefit of and priority to U.S. Provisional Application No. 62/803,233, filed Feb. 8, 2019, and Dutch Application No. 2023366, filed Jun. 24, 2019, the content of each of which is incorporated by reference herein in its entirety and for all purposes.

BACKGROUND

Microfluidic devices can be used to detect and analyze molecules, including proteins, metabolites, and nucleic acids. These devices may also be used for the analysis of larger analytes, such as cells and viruses. In some research and clinical applications, the microfluidic device may be a flow cell used for the analysis of a DNA library, including nucleic acid sequencing by synthesis ("SBS").

In some microfluidic devices, the sequencing process may take as long at 16-48 hours. This length of time may affect clinical applications for which microfluidic devices may be used, such as real-time monitoring of infectious diseases, which may require a shortened turnaround time. In some flow cells, a portion of the sequencing time can be due to the time for the reactions to run to completion at the active surface of the flow cell, such as incorporation of a labeled deoxynucleoside triphosphate (dNTP) and cleavage of the label. Because some flow cells utilize passive diffusion, these reactions occur at a rate based on the time for the reagents to diffuse from the bulk of the aqueous solution within the flow cell to the active surface of the flow cell. Active devices and methods may accelerate reagent exchange and assist in transporting the reagents between the bulk aqueous solution and the active surfaces of the flow cell. A reduction in the reaction time may allow for a faster sequencing process by reducing intervals of time for reagents within the flow cell to adequately mix with the active surface features. Such an improved sequencing processing time may result in a wider range of applications for microfluidic devices.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of the disclosure encompass a fluidic device comprising a flow cell including inlet and outlet ports and a flow channel extending therebetween, the flow channel to receive an analyte of interest and an aqueous solution comprising at least one reagent. The flow cell further comprises a lid, comprising an inner surface and an outer surface, extending over the flow channel, and a base, comprising an inner surface and an outer surface, extending beneath the flow channel. The flow cell further comprises a mixing device to enhance reaction kinetics within the aqueous solution and at the surface, wherein the mixing device comprises at least one of an electrothermal mixing device, an active mechanical mixing device, and an acoustic mixing device. The flow channel has a height of about 20 μm to about 400 μm.

Aspects of the disclosure encompass a method of mixing reagents in a microfluidic device comprising loading an analyte of interest and an aqueous solution comprising at least one reagent into a microfluidic fluidic device, and mixing the aqueous solution with a mixing device, wherein the mixing device comprises at least one of an electrothermal mixing device, an active mechanical mixing device, and a vibrational or acoustic mixing device. The microfluidic device comprises a flow cell including inlet and outlet ports and a flow channel extending therebetween, the flow channel to receive an aqueous solution comprising at least one reagent. The flow cell further comprises a lid, comprising an inner surface and an outer surface, extending over the flow channel, and a base, comprising an inner surface and an outer surface, extending beneath the flow channel. The flow channel has a height of about 20 μm to about 400 μm Aspects of the disclosure encompass a method for reducing sequencing by synthesis cycle time comprising loading nucleic acids or nucleic acid fragments into a fluidic device comprising a flow cell, the flow cell to receive reagent solutions and including inlet and outlet ports and at least one flow channel extending therebetween; amplifying any nucleic acids or nucleic acid fragments which bind to the flow channel; adding four labeled reversible terminators, primers, and polymerase to said flow channel; actively mixing any liquid in said flow channel; detecting any labeled reversible terminators incorporated into nucleic acid fragments bound to said flow channel; removing any blocking groups on said labeled reversible terminators; and repeating the above processes. The flow cell further comprises a lid comprising an inner surface and an outer surface, extending over the flow channel, a base comprising an inner surface and an outer surface, extending beneath the flow channel, and a mixing device comprising at least one of an electrothermal mixing device, an active mechanical mixing device, and an acoustic mixing device. The flow channel has a height of about 20 μm to about 400 μm.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various examples of the subject matter of this disclosure. In the drawings, like reference numbers indicate identical or functionally similar elements.

DETAILED DESCRIPTION

Figure 1:
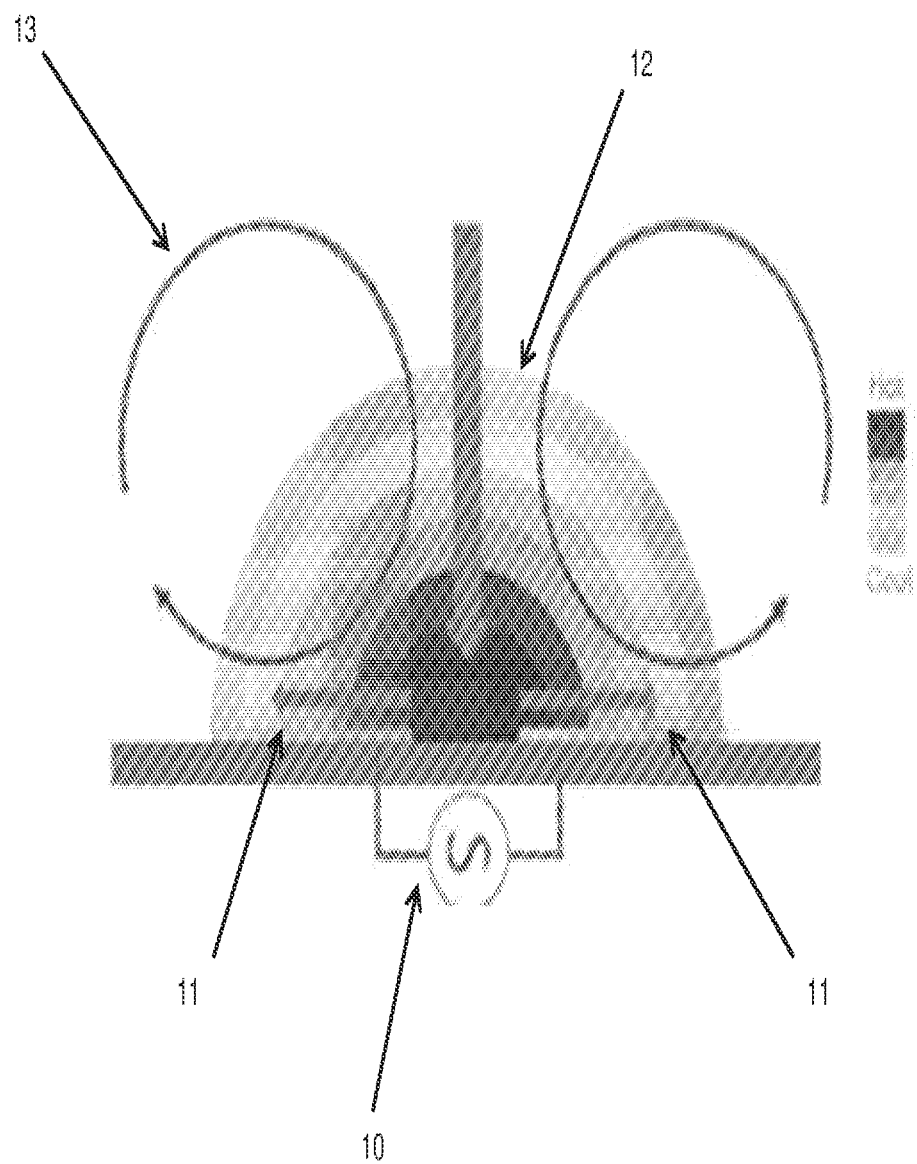
FIG. 1 is a schematic of electrothermal force in a bulk fluid.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or examples so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an example implementation of a device embodying aspects of the disclosure and are not intended to be limiting.

The use of the term "about" applies to all numeric values specified herein, whether or not explicitly indicated. This term generally refers to a range of numbers that one of ordinary skill in the art would consider as a reasonable amount of deviation to the recited numeric values (i.e., having the equivalent function or result) in the context of the present disclosure. For example, and not intended to be limiting, this term can be construed as including a deviation of ±10 percent of the given numeric value provided such a deviation does not alter the end function or result of the value. Therefore, under some circumstances as would be appreciated by one of ordinary skill in the art a value of about 1% can be construed to be a range from 0.9% to 1.1%.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the examples described herein.

It is also to be understood that the use of "to," e.g., "the flow channel to receive the analyte of interest and one or more reagents," may be replaceable with language such as "configured to," e.g., "the flow channel is configured to receive the analyte of interest and one or more reagents", or the like.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as labels, and are not intended to impose numerical requirements on their objects.

The term "fluid communication" means either direct fluid communication, for example, two regions can be in fluid communication with each other via an unobstructed fluid processing passageway connecting the two regions or can be capable of being in fluid communication, for example, two regions can be capable of fluid communication with each other when they are connected via a fluid processing passageway that can comprise a valve disposed therein, wherein fluid communication can be established between the two regions upon actuating the valve, for example, by dissolving a dissolvable valve, bursting a burstable valve, or otherwise opening a valve disposed in the fluid processing passageway.

Advances in the study of biological molecules have been led, in part, by improvement in technologies used to characterize the molecules or their biological reactions. In particular, the study of the nucleic acids DNA and RNA has benefited from developing technologies used for sequence analysis.

Methods for sequencing a polynucleotide template can involve performing multiple extension reactions using a DNA polymerase or DNA ligase, respectively, to successively incorporate labelled nucleotides or polynucleotides complementary to a template strand. In such "sequencing by synthesis" reactions, a new nucleotide strand can be base-paired to the template strand and built up by successive incorporation of nucleotides complementary to the template strand. The nucleotides are added successively to a free hydroxyl group, typically provided by annealing or a sequencing primer, resulting in synthesis of a polynucleotide chain.

To initiate the first SBS sequencing cycle, one or more differently labeled nucleotides and a DNA polymerase can be introduced to the array. Either a single nucleotide can be added at a time, or the nucleotides used in the sequencing procedure can be specially designed to possess a reversible termination property, thus allowing each cycle of the sequencing reaction to occur simultaneously in the presence of all four labeled nucleotides (A, C, T, G). Following nucleotide addition, signals produced at the features on the surface can be detected to determine the identity of the incorporated nucleotide (based on the labels on the nucleotides). Reagents can then be added to remove the blocked 3' terminus (if appropriate) and to remove labels from each incorporated base. Reagents, enzymes and other substances can be removed between steps by washing. Such cycles can then be repeated and the sequence of each cluster is repeated and read over the multiple chemistry cycles.

The substrate nucleoside triphosphates or oligonucleotides used in the sequencing reaction are typically blocked to prevent over-incorporation. This blocking can be achieved through the use of a reversible chain-terminating structural modification or "blocking moiety" that is added to the substrate nucleotides to ensure that nucleotides are incorporated one at a time in a controlled manner Once the modified nucleotide has been incorporated into the growing polynucleotide chain complementary to the region of the template being sequenced, there is no free 3'-OH group available to direct further sequence extension and therefore the polymerase cannot add further nucleotides to the polynucleotide chain. The substrate nucleoside triphosphates or oligonucleotides can also be labelled, permitting determination of the identity of the incorporated nucleotide(s) as successive nucleotides are added. Once the identity of the last-incorporated labelled nucleotide has been determined, the label moiety and 3' or 5' blocking moiety are removed, allowing addition of the next successive nucleotide. By imaging and tracking the labels of these modified nucleotides, it can be possible to deduce the DNA sequence of the DNA template.

Following incorporation of the nucleotides, the sequencing template comprising the array of polynucleotides can be washed to remove any unreacted reagents or unbound molecules, such as a nucleotide or oligonucleotide.

The label that is carried by the modified nucleotides to facilitate their detection may be a fluorescent label. Each nucleotide type may carry a unique fluorescent label. For instance, modified adenine, guanine, cytosine, and thymine may all have attached a different fluorophore to allow them to be discriminated from one another readily. In other implementations, two different fluorophores can be utilized for each of the modified adenine, guanine, cytosine, and thymine, such that determination of the four different nucleotides can be based on fluorescence for two wavelengths where fluorescence of both, only the first wavelength, only the second wavelength, or no fluorescence can each indicate a corresponding different nucleotide. However the detectable label need not be a fluorescent label. Any label can be used which allows the detection of the incorporation of the nucleotide into the DNA sequence.

One method for detecting fluorescent labels, for example on nucleotides, comprises exciting the fluorophore using laser light of a wavelength specific for the label, or the use of other suitable sources of illumination. Fluorescent light emitted from the fluorophore may then be detected by a Charge-Coupled-Device (CCD) camera or other suitable detection means. Other imaging systems for detecting fluorescence may include photodiodes and cameras that comprise a detector component, such as a total internal reflection (TIR) or total internal reflection fluorescence (TIRF) lasers.

Following the imaging process, a reagent comprising a polymerase can be introduced to remove the fluorescent label moiety and the blocking moiety. Any suitable enzymatic, chemical, or photochemical cleavage reaction may be used to cleave the nucleic acids. Suitable cleavage means include, for example, restriction enzyme digestion, in which case the cleavage site is an appropriate restriction site for the enzyme which directs cleavage of one or both strands of a duplex template; RNase digestion or chemical cleavage of a bond between a deoxyribonucleotide and a ribonucleotide, in which case the cleavage site may include one or more ribonucleotides; chemical reduction of a disulphide linkage with a reducing agent (e.g. TCEP), in which case the cleavage site may include an appropriate disulphide linkage; chemical cleavage of a diol linkage with periodate, in which case the cleavage site may include a diol linkage; generation of an abasic site and subsequent hydrolysis, etc.

As used herein, the term "nucleotide" includes naturally occurring nucleotides and nucleotide analogs. Typically, a nucleotide contains a single 5 carbon sugar moiety, a single nitrogenous base moiety and one to three phosphate moieties. In some examples, a nucleotide can include a blocking moiety and/or a label moiety. A blocking moiety on a nucleotide prevents formation of a covalent bond between the 3' hydroxyl moiety of the nucleotide and the 5' phosphate of another nucleotide. A blocking moiety on a nucleotide can be reversible, whereby the blocking moiety can be removed or modified to allow the 3' hydroxyl to form a covalent bond with the 5' phosphate of another nucleotide. A blocking moiety can be effectively irreversible under particular conditions. In some aspects, the blocking moiety may be a chemically cleavable moiety such as an allyl group, an azidomethyl group, or a methoxymethyl group, or may be an enzymatically cleavable group such as a phosphate. A label moiety of a nucleotide can be any moiety that allows the nucleotide to be detected, for example, using a spectroscopic method. Exemplary label moieties are fluorescent labels, mass labels, magnetic labels and the like. One or more of the above moieties can be absent from a nucleotide. For example, a nucleotide can lack a label moiety or a blocking moiety or both.

As used herein, the term "oligonucleotide" includes a polymer of two or more nucleotide subunits. The nucleotide subunits can be naturally occurring nucleotides or nucleotide analogs. The backbone of an oligonucleotide is typically a sugar phosphate backbone but other backbone structures can be used including, but not limited to a protein nucleic acid backbone. An oligonucleotide can be any of a variety of lengths including, but not limited to 3 or more nucleotides, 5 or more nucleotides, 8 or more nucleotides, 10 or more nucleotides, 12 or more nucleotides, 15 or more nucleotides, 20 or more nucleotides, 25 or more nucleotides, 50 or more nucleotides, 75 or more nucleotides, or 100 or more nucleotides.

As used herein, the terms "polynucleotide", "oligonucleotide" or "nucleic acid" can refer to deoxyribonucleic acid (DNA), ribonucleic acid (RNA) or analogs of either DNA or RNA made, for example, from nucleotide analogs. The terms "polynucleotide", "oligonucleotide" or "nucleic acid" are applicable to single stranded (such as sense or antisense) and double stranded molecules. The terms "polynucleotide", "oligonucleotide" or "nucleic acid" as used herein also encompass cDNA, that is complementary or copy DNA produced from an RNA template, for example by the action of reverse transcriptase.

The term "target nucleic acid" is used herein to refer to the primary nucleic acid sample whose sequence is to be determined. In some examples, a target nucleic acid can include any nucleic acid of interest. Target nucleic acids can include DNA, RNA, peptide nucleic acid, morpholino nucleic acid, locked nucleic acid, glycol nucleic acid, threose nucleic acid, mixtures thereof, and hybrids thereof. In some examples, the target nucleic acid can be obtained from one or more source organisms. As used herein the term "organism" means any living or self-replicating particle that is or was previously in existence. As used herein the term "organism" is not necessarily limited to a particular species of organism but can be used to refer to the living or self-replicating particle at any level of classification. For example, the term "organism" can be used to refer collectively to all of the species within a genus, such as Salmonella, or all of the bacteria within the kingdom Eubacteria.

A target nucleic acid can comprise any nucleotide sequence. In some examples, the target nucleic acid can comprise a selected sequence or a portion of a larger sequence. In some examples, sequencing a portion of a target nucleic acid or a fragment thereof can be used to identify the source of the target nucleic acid. In some examples, particular genes or regions of a genome may or may not be sequenced.

Target nucleic acids can be obtained from any source. For example, target nucleic acids may be prepared from nucleic acid molecules obtained from a single organism or from populations of nucleic acid molecules obtained from natural sources that include one or more organisms.

Sources of nucleic acid molecules include, but are not limited to, organelles, cells, tissues, organs, or organisms. Cells that may be used as sources of target nucleic acid molecules may be prokaryotic (bacterial cells, e.g., *Escherichia, Bacillus, Serratia, Salmonella, Staphylococcus, Streptococcus, Clostridium, Chlamydia, Neisseria, Treponema, Mycoplasma, Borrelia, Legionella, Pseudomonas, Mycobacterium, Helicobacter, Erwinia, Agrobacterium, Rhizobium*, and *Streptomyces genera*); archeaon, such as crenarchaeota, nanoarchaeota or euryarchaeotia; or eukaryotic such as fungi, (e.g., yeasts), plants, protozoans and other parasites, and animals (including insects (e.g., *Drosophila* spp.), nematodes (e.g., *Caenorhabditis elegans*), and mammals (e.g., rat, mouse, monkey, non-human primate and human))

In some examples, a target nucleic acid can be obtained from a specific biological source.

In some examples, the target nucleic acid can be a human nucleic acid obtained from a human, for example a sample of human tissue. In other examples, the target nucleic acid can be a human mitochondrial nucleic acid. In other examples, the nucleic acid can be obtained from a metagenomic sample. In other examples, the target nucleic acid can be obtained from an environmental source that no longer comprises living organisms.

Incremental extension cycles for sequencing may be carried out on a solid support. As used herein, the term "solid support" includes one or more materials to which nucleic acids can be attached. Examples include, but are not limited to a plate, bead, particle, slide, microtiter plate, well, flow cell, microarray, or a plurality of such materials. The nucleic acids may be attached to the solid support via direct or indirect, covalent or non-covalent attachment. In some examples, the solid support comprises an inert substrate or matrix (e.g., glass slides, polymer beads, etc.) which has been "functionalized," for example by application of a layer of coating of an intermediate material comprising reactive groups which permit covalent attachment to biomolecules, such as polynucleotides or oligonucleotides. Examples of such supports include, but are not limited to, polyacrylamide hydrogels supported on an inert substrate such as glass. In such examples, the biomolecules (e.g. polynucleotides) may be directly covalently attached to the intermediate material (e.g. the hydrogel) but the intermediate material may itself be non-covalently attached to the substrate or matrix (e.g. the glass substrate).

A population of nucleic acids or nucleic acid fragments can be sequenced as single molecules, or the population may be amplified, for example via bridge amplification in an emulsion, to produce a clustered array or "colony" of nucleic acid molecules. Other examples of suitable amplification methods include rolling circle amplification, isothermal amplification, and polymerase chain reaction (PCR).

Cycles of sequencing using nucleotides and implemented on a microfluidic device, such as a flow cell, may take up to about 15 minutes per cycle for synthesis. To synthesize 200 base nucleotide fragments (which would take 200 cycles of nucleotide incorporation), the time could be up to 50 hours of automated sample preparation. Synthesis of longer molecules may take proportionately longer. The fluidic cycle may involve a cycle of incremental extension and a cycle of de-blocking to allow extension in the next cycle. The cycle may include further washing steps to help ensure the de-blocking reagent and extension reagent do not mix in the flow cell. The steps in each extension cycle may be carried out at the same temperature or at different temperatures. For example, the de-blocking and extension may be carried out at different temperatures.

Figure 22:
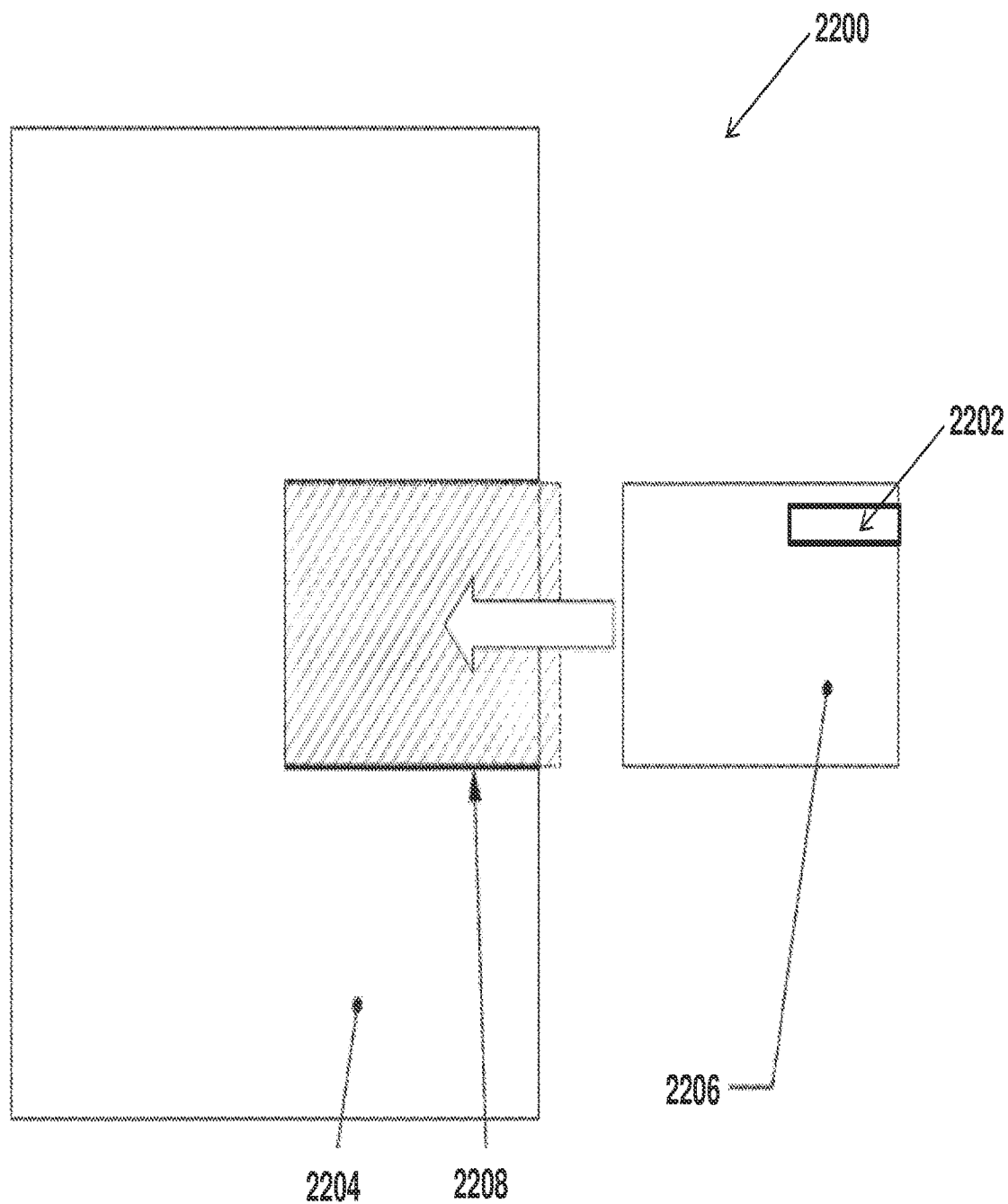
FIG. 22 is a block diagram of an example sequencing system showing a base instrument, a cartridge, and a microfluidic device, such as a flowcell.

According to various examples, a sequencing system 2200, shown in FIG. 22, for analyzing a target nucleic acid can utilize a microfluidic device 2202, such as a flow cell, for analyzing a target nucleic acid. In some implementations, the sequencing system 2200 can include a base instrument 2204, including a fluidics control and delivery system and a detection system. A cartridge 2206 may house one or more fluids, such as reagent, that are utilized by the sequencing system 2200 with the microfluidic device 2202 to perform the analysis of the target nucleic acid. In the implementation shown, the microfluidic device 2202 may be insertable into or otherwise fluidically couplable to the cartridge 2206, which can then be inserted into an opening 2208 of the base instrument 2204. In other implementations, the microfluidic device 2202 can be separately insertable into the base instrument 2204 or otherwise fluidically couplable to the base instrument 2204. In some aspects, the flow cell will receive a plurality of process fluids that may include a polymerase and tagged nucleotides of the four common DNA types, each nucleotide having a unique fluorescent tag and a blocking agent linked thereto. In other phases of the sequencing cycles, the process fluids may include other fluids and reagents, such as regents for removing blocking moieties from nucleotides, cleaving nucleotide linkers, or removing bases from ligated oligonucleotides. For examples, once reactions have taken place at individual sites in the array of sample nucleic acids, the initial process fluid containing the tagged nucleotides will be washed from the sample in one or more flushing operations. The sample may then undergo detection, such as by the optical imaging via the detection system. Subsequently, reagents will be added by the fluidics control and delivery system of the flow cell to de-block the last added nucleotide and remove the fluorescent label from each. Another washing operation may then be used to prepare for a subsequent cycle of sequencing.

The rates of chemical reaction on the active surface of a microfluidic device, such as a flow cell, are determined by the collision rates of the different reagents, which in turn are determined by the concentrations of the reagents at the reaction centers on the active surface. When a new reagent is injected into a flow cell, because of a laminar flow profile at low Reynolds numbers, the concentration at the active surface does not immediately equal the bulk reagent concentration. Diffusive transport drives the reagents to the active surface to react with compounds or other elements located there. Further, as reagents are depleted near the active surface by the reactions, fresh reagents have to be brought in by diffusion to continue the reactions. As set forth below in Equations 1 and 2, the rate of diffusive transport is proportional to the concentration gradient and varies inversely with the size of the molecule. In the absence of any chaotic mixing, shallow concentration gradients are created, which limit the rates of transport. The characteristic time scales for diffusion of a molecule scales as the square of the distance to diffuse and inversely with the diffusion constant, as shown below in Equation 3. For a large molecule like DNA polymerase, with a diffusion constant of ~20 microns$^2$/sec, Equation 3 leads to characteristic diffusion times of about 2 minutes to travel from the center of a 100-micron-thick flow cell to the active surface, which may pose a fundamental limit on sequencing by synthesis ("SBS") cycle time.

$$Flux = -D \cdot \frac{dc}{dx} \quad \text{(Equation 1)}$$

$$D = \frac{k_B T}{6\pi a \eta} \quad \text{(Equation 2)}$$

$$\text{diffusion time} \sim \frac{l^2}{D} \quad \text{(Equation 3)}$$

where D is the diffusion constant, C is the concentration of the reagent, $k_B$ is the Boltzmann constant, $\alpha$ is the radius of the molecule, $\eta$ is viscosity, and l is the distance to diffuse.

There may be a need for methods and devices to accelerate reagent exchange and to actively drive the reaction rates faster than those permitted by passive diffusive transport. In addition, there may be a need for improved DNA sequencing technologies for use in clinical applications where reduced time constraints may exist, with reduced reaction time for the SBS process, including incorporation and cleavage of the labels. Furthermore, there may be a need for improved mixing techniques in particularly small microfluidic devices with a microchannel height in the range of about 20 μm to about 400 μm, and more specifically in the range of about 50 -100 μm.

Electrothermal Mixing in a Flow Cell

According to various examples, a fluidic device, such as the microfluidic device 2202 of FIG. 22, comprises a flow cell with inlet and outlet ports and a flow channel extending therebetween, the flow channel to receive an aqueous solution comprising various constituents (e.g., reagents, buffer, reaction media), which will undergo one or more fluid operations (e.g., mixing, processing, reaction, detection). The fluidic device further comprises a lid extending over the flow channel and a base extending beneath the flow channel. One or both of the base and the lid may include an imprint or other physical channel defining the flow channel. In some examples, accelerating biological reactions within the aqueous solution in the flow cell can be achieved via electrothermal mixing, wherein bulk fluid movement can be driven by electric field gradients in the fluid using electrodes.

Some flow cells are passive fluidic devices, in that once the reagent is pumped into the flow cell, the flow cell is a passive temperature-controlled reactor where reactions are limited by the rate of diffusion through the bulk in the aqueous solution. However, electrothermal mixing adds energy to create an active fluidic system, which increases the collisions between the reagent molecules to accelerate the SBS process, hybridization, and binding reactions. This technique may also be used to accelerate other workflows for clinical processing of biological samples, such as library preparation (e.g., mixing of DNA and active tagmentation), sample enrichment (e.g., active capture, washing, and mixing), and seeding and clustering. Faster processing ultimately creates faster turnaround time, simplified workflow, lower DNA input, and reduced reagent volumes and cost of goods sold. Furthermore, this mixing method may be extended to other electrokinetic effects such as dielectrophoresis (DEP), which can be employed in pulling down and enriching target species, useful in workflows to accelerate binding of DNA molecules to beads or to control the spatial deposition of beads in a flow cell.

As shown in FIG. 1, electrothermal mixing can be conducted by applying a non-uniform alternating current ("AC") electric field 10 through an aqueous solution. The AC electric field 10 is applied to an electrode array comprising a plurality of electrodes 11. This in turn dissipates power in the solution and leads to small temperature gradients 12. Since the conductivity and permittivity of aqueous solutions are temperature dependent, the applied AC electric field 10 creates gradients in conductivity and permittivity in the aqueous solution. Those gradients lead to free space charges that produce a bulk fluid motion 13. In fluidic devices disclosed herein, which are operating in the megahertz (MHz) range, electrochemistry may be negligible, such that the electrothermal mixing may be compatible with current SBS chemistry and reagents. That is, while for direct current (DC) or low frequency signals, electrodes exposed to reagents may undergo electrochemical reactions (e.g., oxidations or reductions), which can dissolve or otherwise damage the electrodes and the DNA molecules and reagents in the vicinity, the high frequencies used in the present fluidic devices may mitigate any electrochemical damage.

The equation governing electrothermal force in a bulk fluid is shown below in Equation 4:

$$\langle f_E \rangle = \frac{1}{2}\left[\left(\frac{\nabla\sigma}{\sigma} - \frac{\nabla\varepsilon}{\varepsilon}\right)\cdot\vec{E}_o \frac{\varepsilon\vec{E}_o}{(1+(\omega\tau)^2)} + |E_o|^2 \nabla\varepsilon\right] \quad \text{(Equation 4)}$$

where σ and ε are the conductivity and permittivity of the aqueous solution, respectively, E is the electric field strength, ω is the field frequency, and ρ is the charge relaxation time of the aqueous solution. This equation has been solved for the parallel electrode geometry and the dependence of the fluid velocity on key parameters follows in Equation 5:

$$\text{velocity} \propto \frac{\varepsilon\sigma V^4}{k\eta r^3} \quad \text{(Equation 5)}$$

where k is the thermal conductivity of the solution, η is the fluid viscosity, r is the distance away from the center of the inter-electrode gap, and V is the voltage applied between the electrodes.

Importantly, the velocity scales as the first power of the conductivity and the fourth power of the electric field. The first implication from this is that electrothermal mixing can be amenable to a large conductivity range of buffers in a clinical application workflow. Secondly, there can be a large impact on velocity of the aqueous solution from applying higher electric fields.

In the low conductivity regime (~<0.01 S/m), a related electrokinetic effect, electro-osmosis, is dominant. This is driven by a force on the charge layer formed against the electrodes in the electrode array. In the presence of an alternating electric field, fluid flows are created tangentially on the electrode surfaces. Thus, the same electrode arrays that are used to drive electrothermal motion in high conductivity aqueous solutions can also be used to drive fluidic mixing using electro-osmosis for low conductivity aqueous solutions.

Figure 2:
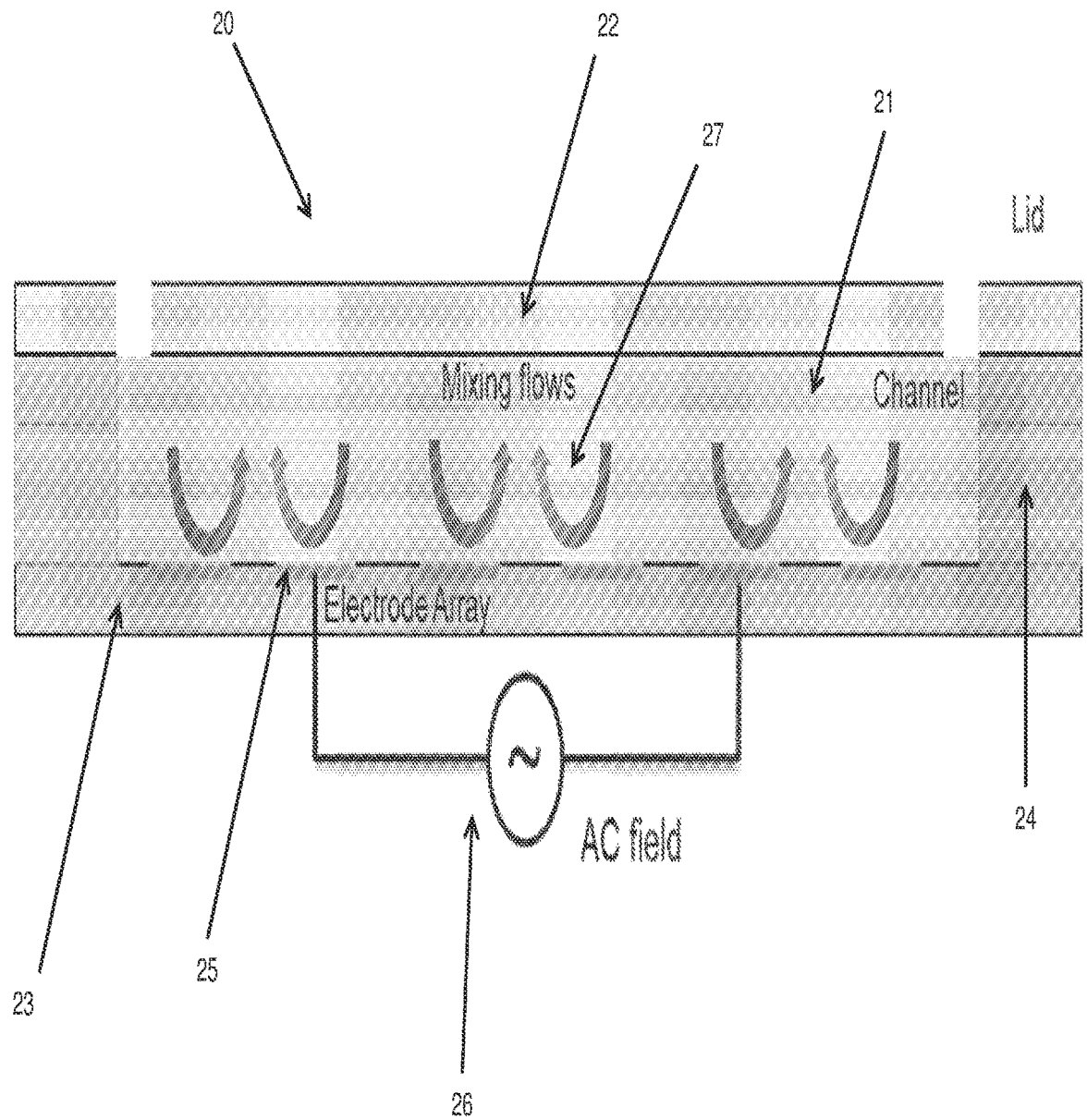
FIG. 2 is a schematic of an example fluidic device comprising a flow cell with electrothermal mixing via an applied AC electric field.

As shown in FIG. 2, an example fluidic device comprises a flow cell 20 having a base 23 and a lid 22 defining a flow channel 21 to receive an aqueous solution comprising various constituents (e.g., reagents, buffer, reaction media), which will undergo one or more fluid operations (e.g., mixing, processing, reaction, detection). The lid 22 extends over the flow channel 21 and the base 23 extends beneath the flow channel 21. In various examples, the lid 22 and base 23 may comprise a glass or polymer material. In various examples, the material for the base 23 or lid 22 may comprise a cyclic olefin copolymer (COC), a polycarbonate (PC), or poly(methyl methacrylate) (PMMA). In some examples, the lid 22 and base 23 have dimensions sufficient to accommodate one or more flow channels 21 therebetween. In various examples, the flow cell 20 further comprises side walls or spacers 24 within the flow channel 21, wherein the height of the side walls or spacers 24 equals the height of the flow channel 21. In some examples, the height of the flow channel 21 is in the range of about 20 µm to about 400 µm. In some examples, the height of the flow channel 21 is about 50-100 µm. In some examples, an electrode array comprising a plurality of electrodes 25 is embedded within the flow channel 21 and connected to an AC electric field 26, which creates bulk flow 27 within the aqueous solution in the flow channel 21. In some examples, the electrode array is embedded within the lid 22, within the base 23, and/or within a side wall 24 of the flow channel 21, and/or within a spacer 24 within the flow channel 21.

Figure 3:
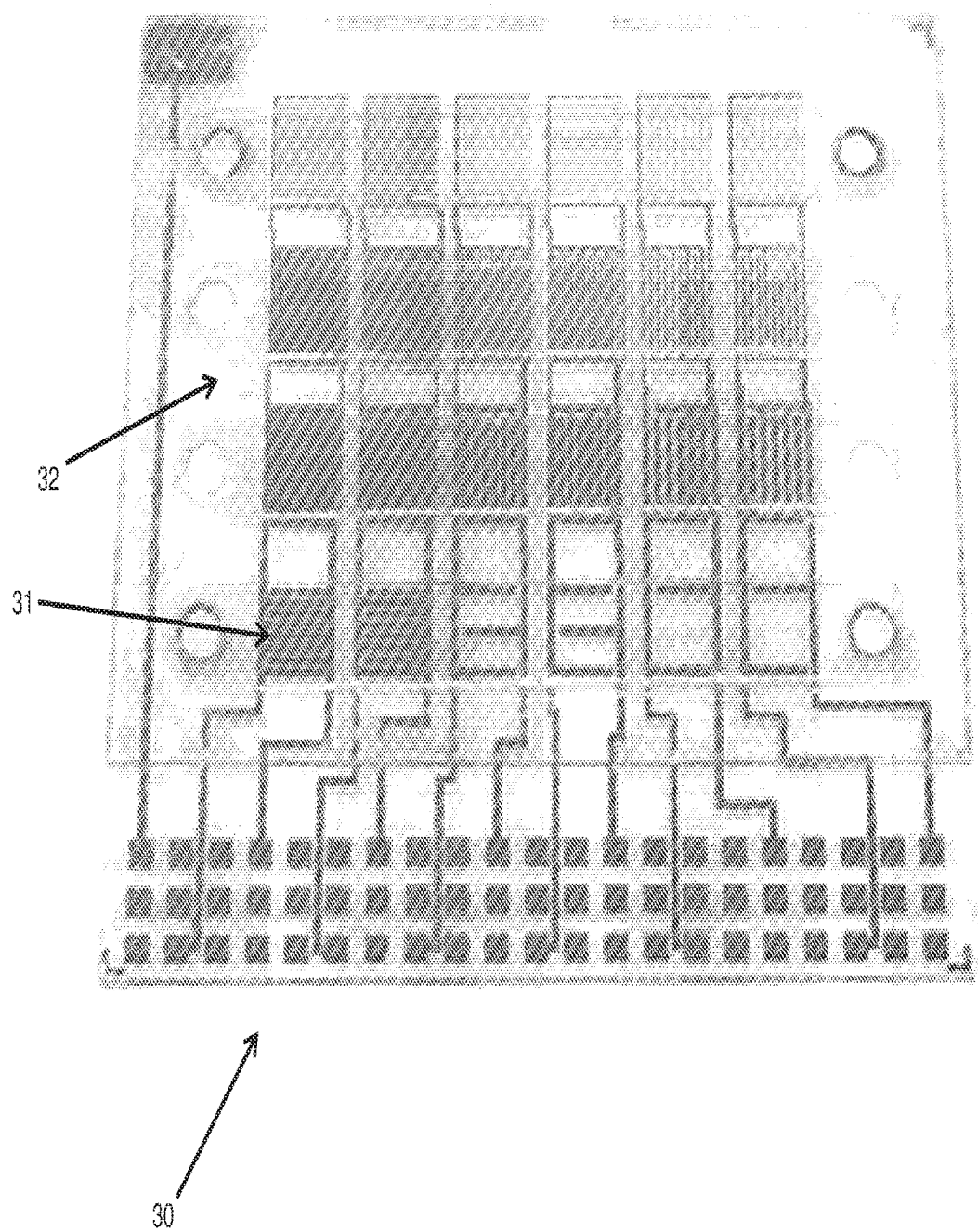
FIG. 3 is an image of an example interdigitated electrode array, in which the electrodes are arranged in a coplanar arrangement.

The limited height of the flow channel 21 restricts flow movement within the flow channel 21 as flow profiles are predominantly laminar flow therethrough because of the limited height dimension. Such laminar flow profiles can restrict or limit flow circulation within the flow channel 21. The configuration and arrangement of electrodes can be arranged to induce recirculation mixing even despite the limited height dimension. That is, the electrode arrays may have various geometries and configurations to induce electrothermal mixing even in a limited height dimensioned area, such as the flow channel 21. In various examples, the electrodes in the electrode array are arranged in a coplanar configuration. FIG. 3 shows an interdigitated electrode array 30 wherein the electrodes 31 are arranged in a coplanar configuration on a glass surface 32 for a flow cell. In other examples, the electrodes in the electrode array are arranged such that they are facing each other (e.g., electrodes within the lid and base, or on each side channel wall or spacers). In some examples, the electrodes in the electrode array may be spaced apart with non-uniform gaps therebetween. In some examples, the electrodes are spaced apart so as to create gradients in conductivity and permittivity in the aqueous solution. In various examples, the electrodes comprise a conductive metal material. In various examples, the material for the electrodes may comprise gold (Au), platinum (Pt), aluminum silicon (AlSi), aluminum (Al), indium tin oxide (ITO), or the like. In some examples, the electrodes have a thickness of in the range of about 20 nm to about 2 µm. In some examples, the electrodes have a thickness of about 200 nm. In some examples, the electrodes in the electrode array comprise non-uniform dimensions or vary in size.

In some examples, an AC electric field is applied to the electrode array, wherein the AC electric field is generate by a waveform generator. In some examples, the waveform generator has a frequency in the range of about 10 kHz to about 100 MHz and an amplitude in the range of about 1 Vpp to about 1000 Vpp (peak-to-peak voltage) sine wave output. In some examples, an amplifier is used to further increase the applied voltage. Depending on the electrode array geometry, the spacing between the electrodes, and the individual electrode dimensions, in-plane or out-of-plane flows may be created in the aqueous solution, with flow amplitudes dependent on voltage and the conductivity of the aqueous solution.

Usage of a direct electrothermal mixing configuration may affect certain thermally or electrically sensitive reagents or other elements that are to be mixed. That is, in some instances, reagents and/or electrode degradation may occur. These detrimental effects are particularly problematic in flow channels with limited dimensions, where the electrothermal mixer is in close proximity to the sensitive reagents and the effects of electrothermal mixing are concentrated in a small area. However, the introduction of a passivation or dielectric layer, as discussed below, may reduce or eliminate the potential for undesirable heating or chemical, biochemical, or electrochemical damage.

Figure 5:
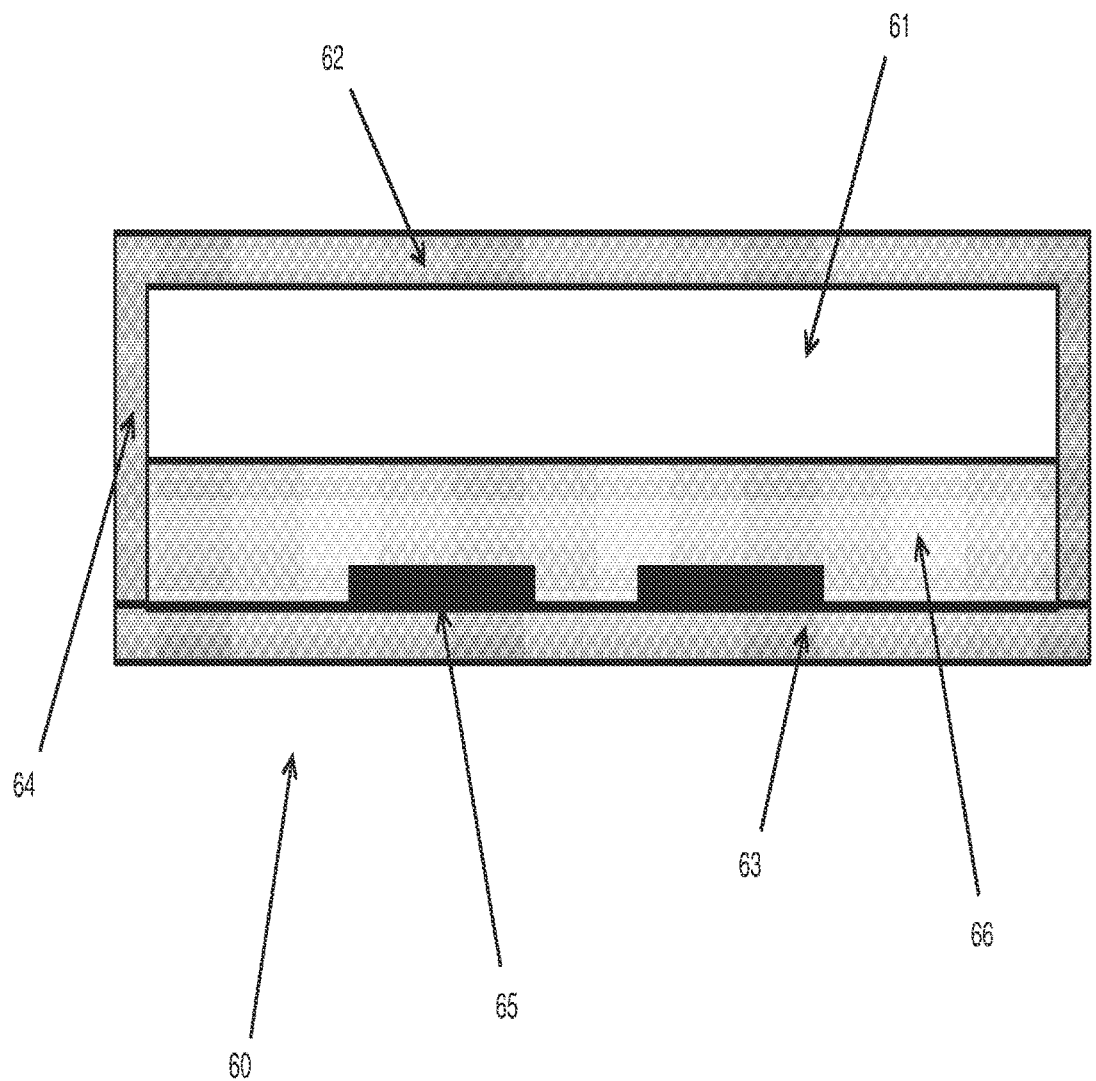
FIG. 5 is a schematic of an example fluidic device comprising a flow cell with an electrode array embedded within a passivation layer.

As shown in FIG. 5, an example fluidic device comprises a flow cell 60, wherein the flow cell 60 comprises a flow channel 61 to receive an aqueous solution comprising various constituents (e.g., reagents, buffer, reaction media), which will undergo one or more fluid operations (e.g., mixing, processing, reaction, detection). The fluidic device further comprises a lid 62 extending over the flow channel 61 and a base 63 extending beneath the flow channel 61. In various examples, the flow cell 61 further comprises side walls or spacers 64 within the flow channel 61, wherein the height of the side walls or spacers 64 equals the height of the flow channel 61. In some examples, the height of the flow channel 61 is the range of about 20 µm to about 400 µm. In some examples, the height of the flow channel 61 is about 100 µm or less. In some examples, the flow cell further comprises an electrode array, comprising a plurality of electrodes 65, embedded within a passivation layer 66 (together creating a nanopatterned or nanoimprinted layer), wherein the passivation layer 66 comprises a dielectric material. The passivation layer 66 serves to protect the molecules at the reaction surface within the aqueous solution from potential electrode-mediated chemical, biochemical, or electrochemical damage.

However, while a passivation layer may help to protect the electrodes and molecules from electrochemical degradation, the passivation layer can also reduce the electrothermal force generated, and hence reduce the mixing flow in the fluid bulk. This effect on the mixing force in the fluid bulk thus makes it unexpected that electrothermal mixing through an insulating passivation layer would work. Indeed, when the passivation layer is added, the passivation layer acts as a capacitor in series with the electrodes and the aqueous solution or fluid within the flow channel. As a consequence, the electrical circuit is modified and it exhibits a new characteristic frequency, defined herein as $f_{pass}$, as shown in Equation 6 below. This frequency defines a threshold, where below the frequency threshold, most of the voltage applied to the electrodes will drop across the passivation capacitor, while above the frequency threshold, most of the voltage drop will occur across the fluid. To obtain an effective electrothermal force, the voltage drop can be maximized across the fluid. The frequency $f_{pass}$ is determined as the following in Equation 6:

$$f_{pass} = \frac{1}{2\pi R_{Fluid} C_{pass}} \qquad \text{(Equation 6)}$$

where $R_{fluid}$ is the fluid resistance and $C_{pass}$ is the passivation capacitance, and where $R_{fluid}$ is determined as the following in Equation 7:

$$R_{Fluid} = \frac{K}{\sigma}, C_{pass} = \frac{\varepsilon S}{t} \qquad \text{(Equation 7)}$$

where K is the electrode cell constant, σ is the fluid conductivity, ε is the passivation layer dielectric constant, t is its thickness and S is the surface area defined by the electrodes. As demonstrated above based on the newly defined equations, the disclosed electrothermal mixing configuration with a passivation layer is useful to limit potential chemical, biochemical, or electrochemical damage that can result from direct exposure of a fluid within the flow channel while preserving the ability to induce electrothermal mixing within the flow channel.

From these expressions, the parameters can be adjusted in order to maximize the electrothermal mixing. For instance, driving the electrodes with a higher frequency and lowering the passivation layer thickness may effectively generate stronger mixing flows and higher flow velocities. The same result may be achievable by using a stronger dielectric material (such as $Ta_2O_5$), increasing the liquid conductivity, or increasing the cell constant by adjusting the electrode design or geometric arrangement. Thus, when utilizing modified electric field conditions based upon the considerations for Equations 6-7 above, it is possible to utilize a variety of passivation layers while preserving the electrothermal mixing. For instance, such passivation layers may be a wide range of dielectrics such as the hydrophilic $SiO_2$, nanoimprint resin, hydrophobic CYTOP™ photoresist, etc.

Figure 4:
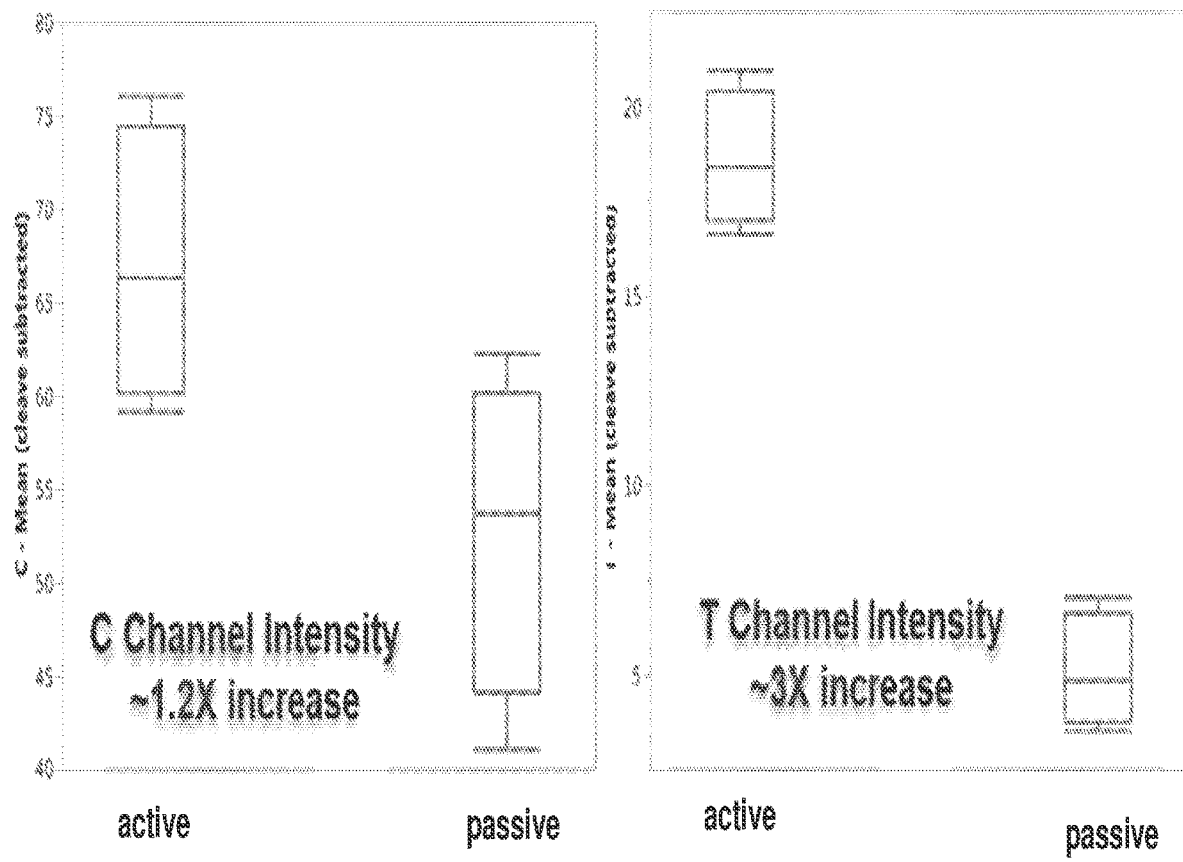
FIG. 4 is a set of graphs showing incorporation intensities, quantified for the C and T channels, in a flow cell with active electrothermal mixing, as compared to a passive flow cell.

In one experiment, clusters of a phiX library were grafted onto a (poly(N-(5-azidoacetamidylpentyl) acrylamide-co-acrylamide))(PAZAM)-coated electrode array to test electrothermal mixing as applied to nucleotide incorporation during the SBS process. The surface of the electrode array was then stepped through successive cycles of incorporation with ffNs (labeled nucleotides) and cleavage. Every alternate cycle of incorporation was done with active electrothermal mixing for a reaction time of 3 minutes at 1 MHz and 20 Vpp, and at room temperature. As shown in FIG. 4, up to a 1.2-3× increase in incorporation intensities (quantified for the C and T channels) and corresponding kinetics could be seen for certain dNTPs, as compared to the passive reaction control under the same conditions. The A and G channels similarly showed about a 1.5× and 3× incorporation intensity enhancement, respectively.

In some examples, electrothermal mixing may be applied to other clinical application workflows. For instance, electrothermal mixing may be utilized during one or more of a DNA seeding, a DNA cluster generation process, a DNA hybridization, an incorporation process, a cleave process, a scavenger process, a scan process, and/or a wash process.

In some examples, the dielectric material of the passivation layer may comprise $SiO_2$, $Ta_2O_5$, $Si_3N_4$, or a soft polymeric material or insulating material (e.g., CYTOP™ fluoropolymers or parylene poly(p-xylylene)). In some examples, the passivation layer has a thickness in the range of about 20 nm to about 2 µm.

Electrothermal mixing through a passivation layer allows for the fluidic device to achieve very high mixing velocities, which may be further increased using a high voltage amplifier. In some examples, the mixing velocity may exceed 100 microns/second. For instance, for a 400-nm-thick $SiO_2$ passivation layer, when the applied AC electric field comprises a waveform generator with a 12 MHz, 20 Vpp (peak-to-peak voltage) sine wave output, the passivation layer attenuates a mixing effect comparable to fluidic devices where the electrodes are exposed (such as in FIG. 2). In some examples, an amplifier may be used to apply higher voltages which dramatically increase the flow velocities. In some examples, the flow trajectories are longer than about 10× the flow trajectories without the higher voltages.

Figure 6:
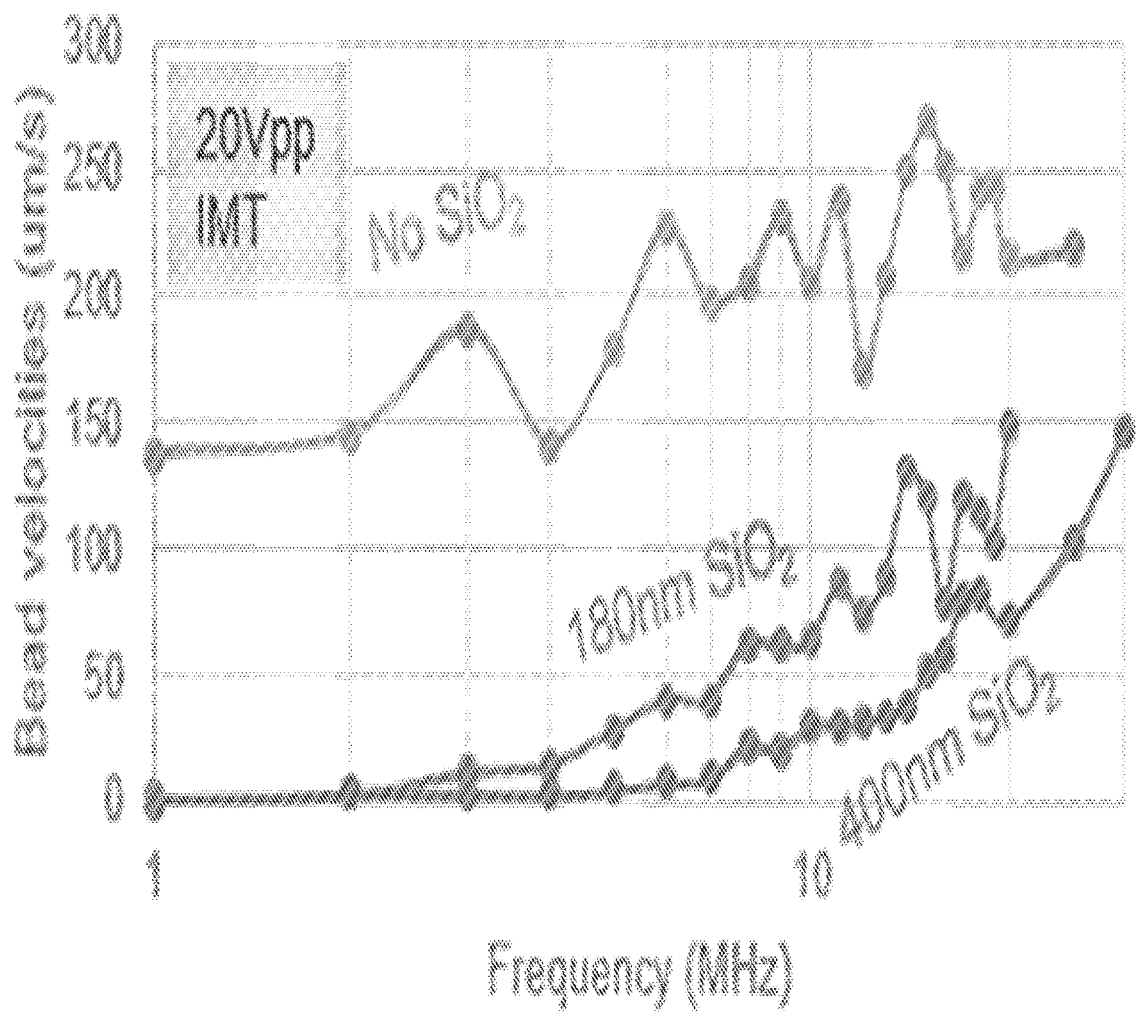
FIG. 6 is a graph showing velocity versus frequency as a function of passivation layer thickness.

FIG. 6 shows velocity (as tested with beads in the aqueous solution) versus frequency as a function of passivation layer thickness (i.e., 400 nm $SiO_2$, 180 nm $SiO_2$, and no passivation layer) for a concentric electrode design supplied with 20 Vpp and the flow channel filled with an IMT buffer solution. As shown in the graph, velocity increases with increasing frequency, and passivation layers with lower thicknesses resulted in higher flow velocities.

Figure 7:
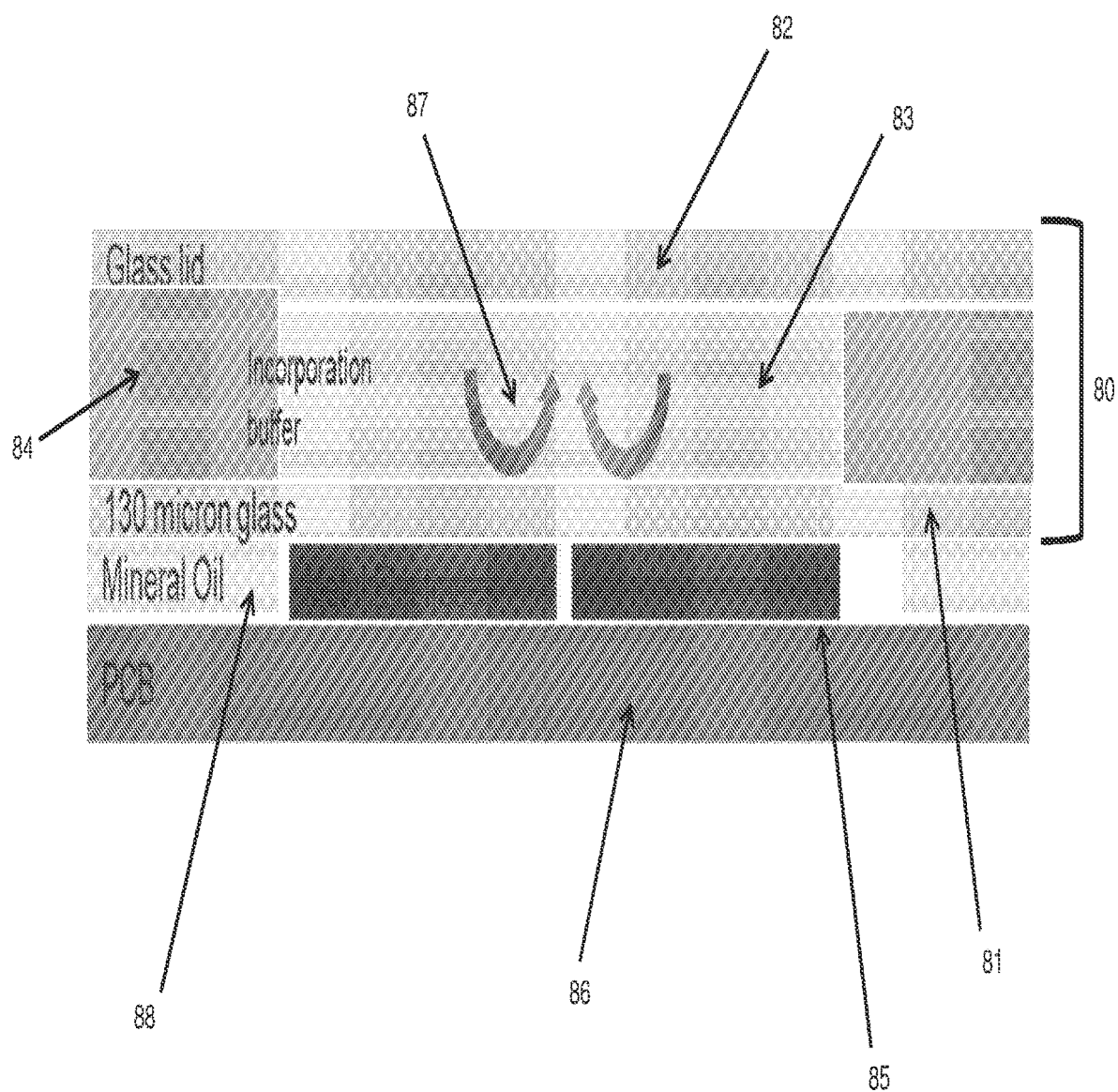
FIG. 7 is a schematic of an example fluidic device with electrothermal mixing through a glass surface.

As shown in FIG. 7, an example fluidic device comprises a flow cell 80 comprising a base 81 and a lid 82, and a flow channel 83 extending therebetween. In some examples, the flow channel 83 has a height in the range of about 20 µm to about 400 µm. In some examples, the flow channel 83 has a height of about 50-100 µm. In some examples, the flow cell 80 further comprises side walls and/or spacers 84 within the flow channel 83. In some examples, an electrode array comprising a plurality of electrodes 84 is positioned outside of the flow channel 83 and external to the flow cell 80. This configuration, wherein the electrothermal mixing is achieving via an external instrument, allows for modular integration into an existing fluidic device, without significant modification and/or cost impact to the flow cell.

In some examples, the lid 82 and/or the base 81 of the flow cell 80 comprises a glass material. In some examples, parallel electrodes 84 in an electrode array are placed on a printed circuit board 86, which is positioned adjacent to a glass slide serving as one of the surfaces of the flow cell 80. In some examples, the glass side serving as one of the surfaces of the flow cell 80 has a thickness in the range of about 80 µm to about 1 mm. In some examples, a high voltage amplifier (e.g., ENI2100L) was used to electrothermically mix incorporation buffer within the flow channel 83 through bulk fluid flow 87. In some examples, flow velocities exceeding 70 microns/second were achieved.

Poor contact between the flow cell 80 and the electrodes 85 may introduce an air space, which can act as an additional capacitor. This additional capacitor may lead to a loss of potential that can lessen the electrothermal effects and slow the mixing flows 87. To mitigate this, a filling material 88 with a higher dielectric constant than the one of air can be introduced between the electrodes on the printed circuit board 86 and the glass flow cell 80. As shown in FIG. 7, this layer may be made of mineral oil, a gel, or any soft polymeric material. Given that mineral oil can spread if not contained, in one example, the layer with the filling material comprises a gel.

Figure 21:
FIG. 21 is a cluster imaging of a flow cell with a flow channel height of 100 µm, as compared to a flow cell with a flow channel height of 200 µm.
Figure 21:

Some flow cells used in clinical applications can have a very small flow channel height. A height of about 20 µm to about 400 µm, and more specifically a height of about 100 µm, is used in some applications because this small channel height limits reagent consumption and may result in improved optical performance However, mixing, particularly electrothermal mixing, in such small channels presents several challenges as noted above. For instance, mixing in a microfluidic channel with a height of about 100 µm was found to be diminished with some electrode designs such as with large electrodes and large uniform gaps between the electrodes. Specifically, in a flow channel with a height of about 100 µm and electrodes with a width of about 475 µm, separated by a 750 µm gap and driven with 20 Vpp at 10 MHz, exhibited almost no electrothermal flow. However, with the same electrodes and under the same conditions, a flow channel with a height of about 1200 µm exhibited significantly increased electrothermal flow. Even a flow channel with a height of just 200 µm exhibited greater electrothermal mixing and a higher flow rate as compared to a flow cell with a height of 100 µm, as shown in FIG. 21 through longer fluorescent-bead trace.

In some examples, the flow channel of the fluidic device has a height of about 50-200 µm. In some examples, the flow channel of the fluidic device has a width of about 2 mm to about 20 mm. In some examples, the fluidic device comprises an electrode array comprising a plurality of electrodes. In some examples, the electrodes have a width in the range of about 20 µm to about 800 µm. In some examples, the electrodes have a gap therebetween in the range of about 50 µm to about 750 µm. In some examples, the plurality of electrodes within the electrode array vary in size and are spaced apart with non-uniform gaps therebetween. In some examples, a first electrode and a second electrode of the plurality of electrodes are separated by a gap, the gap comprising a first distance between the first and second electrodes and a second distance between the first and second electrodes, wherein the first distance and the second distance are different, such that the gap is non-uniform. In some examples, the electrodes are arranged in a concentric design, comprising a substantially circular center electrode surrounded by U-shaped, or crescent-shaped, electrodes arranged around the center electrode. In some examples, as shown in FIG. 21, the crescent-shaped electrodes each comprise a center portion, a first distal end, and a second distal end. In some examples, the substantially circular center electrode comprises wing portions extending from opposite sides of the substantially circular shape. In some examples, each wing portion comprises a proximal end connected to the substantially circular shape and a distant end extending away from the substantially circular shape, and wherein the width of the wing portion increases gradually from the proximal end to the distant end. In some examples, the circular center electrode has a diameter of about 500 µm, and in some examples, the U-shaped, or crescent-shaped, electrodes have a width of about 200 µm.

Figure 8A:
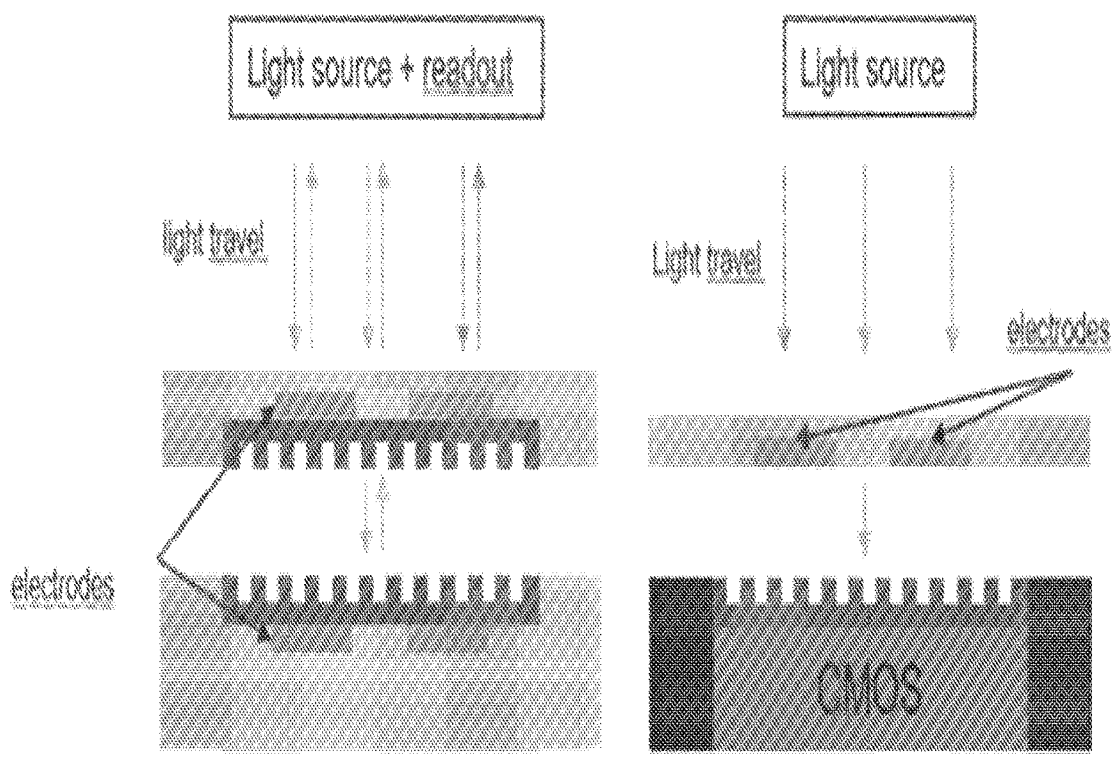
FIG. 8A is a schematic cross-sectional view of two types of flow cells, showing the optical challenges with an integrated electrode arrangement.
Figure 8B:
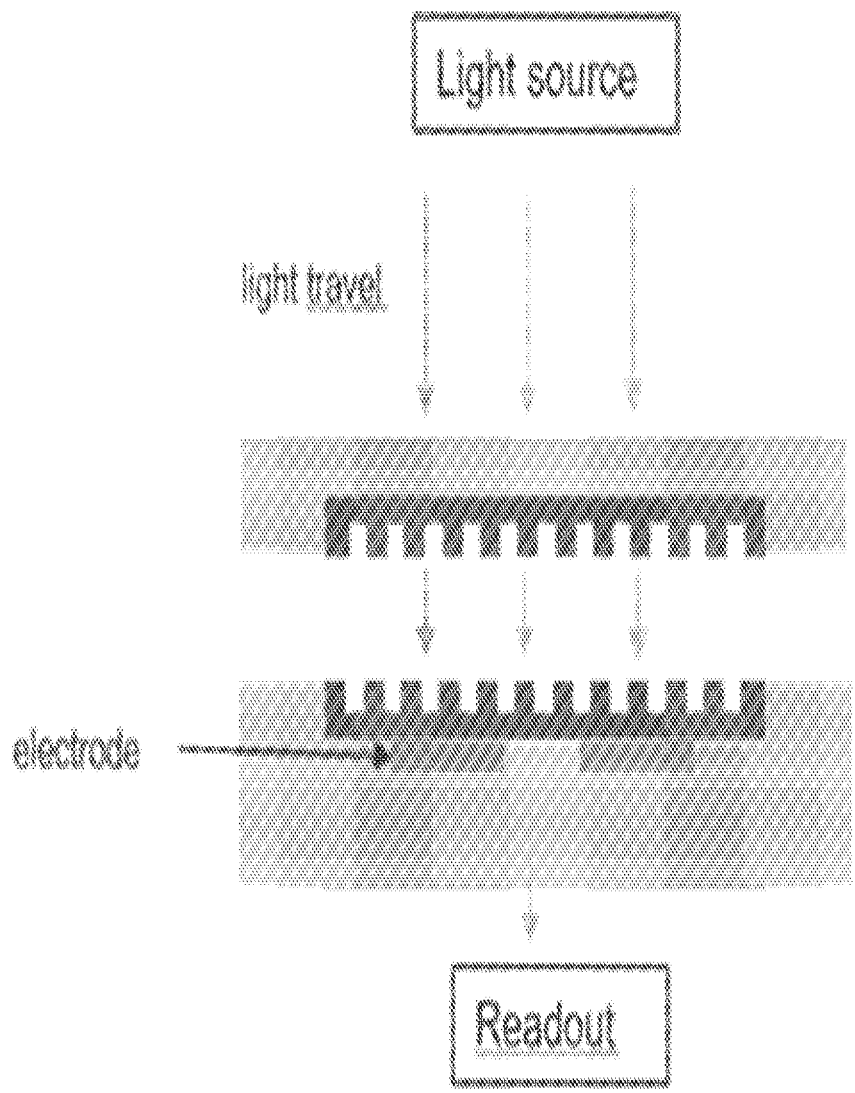
FIG. 8B is a schematic cross-sectional view of a flow cell, showing the optical challenges with an integrated electrode arrangement.
Figure 8C:
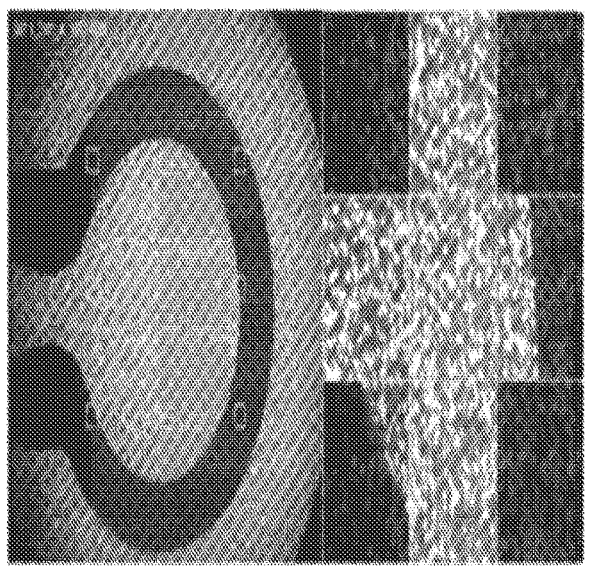
FIG. 8C is a cluster imaging of a flow cell with an electrode, as compared to a flow cell without an electrode.
Figure 8C:
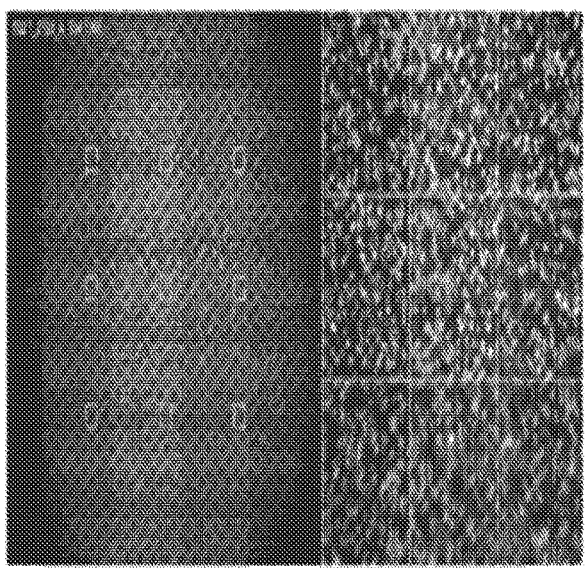

Beyond the potential electrode chemical, biochemical, or electrochemical damage described above and demonstrated as mitigatable using a passivation layer, the integration of electrodes can introduce challenges with regard to imaging sequencing surfaces, collecting fluorescent light from clusters, and/or providing uniform cluster intensity. FIGS. 8A-C show the optical challenges with integrated electrodes that block illumination light or detection of emitted light from a sequencing surface. In particular, FIG. 8A shows how the electrodes can prevent the light from reaching the active, or sequencing, surface within the flow cell, wherein the CMOS serves as a detector or readout device. FIG. 8B shows how the electrodes can prevent the readout of fluorescence from the sequencing surface. FIG. 8C shows cluster imaging of a surface with integrated electrodes and without electrodes. The images reveal that the surface with integrated electrodes exhibits a non-uniform cluster intensity, such that there are brighter clusters over the electrodes and dimmer clusters outside of the electrode areas.

The use of conductive transparent material can be used to circumvent these challenges. However, transparent conductive material, typically made of ITO or silver nanowires, exhibits a higher resistivity of 1 to 2 orders of magnitude as compared to metal or conductive inks. This high resistance can significantly lower the electrothermal force generated in the flow channel fluid because much of the applied potential is lost within the conductive lines. As described herein, certain configurations for the electrothermal mixing system can be utilized to mitigate this problem.

First, a thicker transparent conductive layer comprising transparent conductive electrodes may be used in the fluidic device. Such a transparent conductive layer can be in addition to the passivation layer described above and/or independent of a passivation layer. Line resistance of the transparent conductive layer can be reduced inversely proportional to the conductive layer thickness. This can be particularly useful when using transparent conductive electrodes, such as ITO or silver nanowires, as the resistivity of ITO or silver nanowires can be larger than that of metals or conductive inks. The integration of a thick conductive layer can be facilitated through a laminate process to add the electrodes onto a glass surface before the glass surface is incorporated into the flow cell. In addition, it can be difficult to deposit ITO in thick layers using some microelectronics methods, as the deposition of ITO can create a stress on the surface and eventually form cracks in the layer. Laminating an existing ITO layer on the glass surface may thus prevent or reduce differential stress. In some examples, this method can be applied to any conductive material, including the transparent conductive material. In some examples, this laminating method may also be used for applying electrodes to at least one glass surface within the flow cell.

Second, a heterogeneous conductive line may be implemented within the flow cell. In order to further minimize the line resistance. That is, a combination of highly conductive line (e.g., metal, conductive inks) and transparent conductive layers may be used such that the transparent electrodes are present in the imaging areas while the highly conductive line(s) are positioned elsewhere. The highly conductive lines can be made via microelectronics processes (e.g., metal deposition) or printed electronic processes (e.g., conductive ink deposition).

Third, an index matching layer may be added to the layers of the flow cell. In order to increase the optical performance of the stack (e.g., high transmittance or low reflectance), the index matching layer can be introduced between the electrode layer and the active surface layer, such as a nanowell layer or other active surface layer. In some examples, the index matching layer may comprise a material which has an index of refraction that is approximately the same as the transparent conductive layer, such that light which passes from the index matching layer to the transparent conductive layer and vice versa will pass with minimal reflection or refraction between the two layers. In some examples, the index matching layer may comprise one or more layers that have a specific thickness and refractive index. In some examples, the index matching layer comprises a transparent material.

Figure 9:
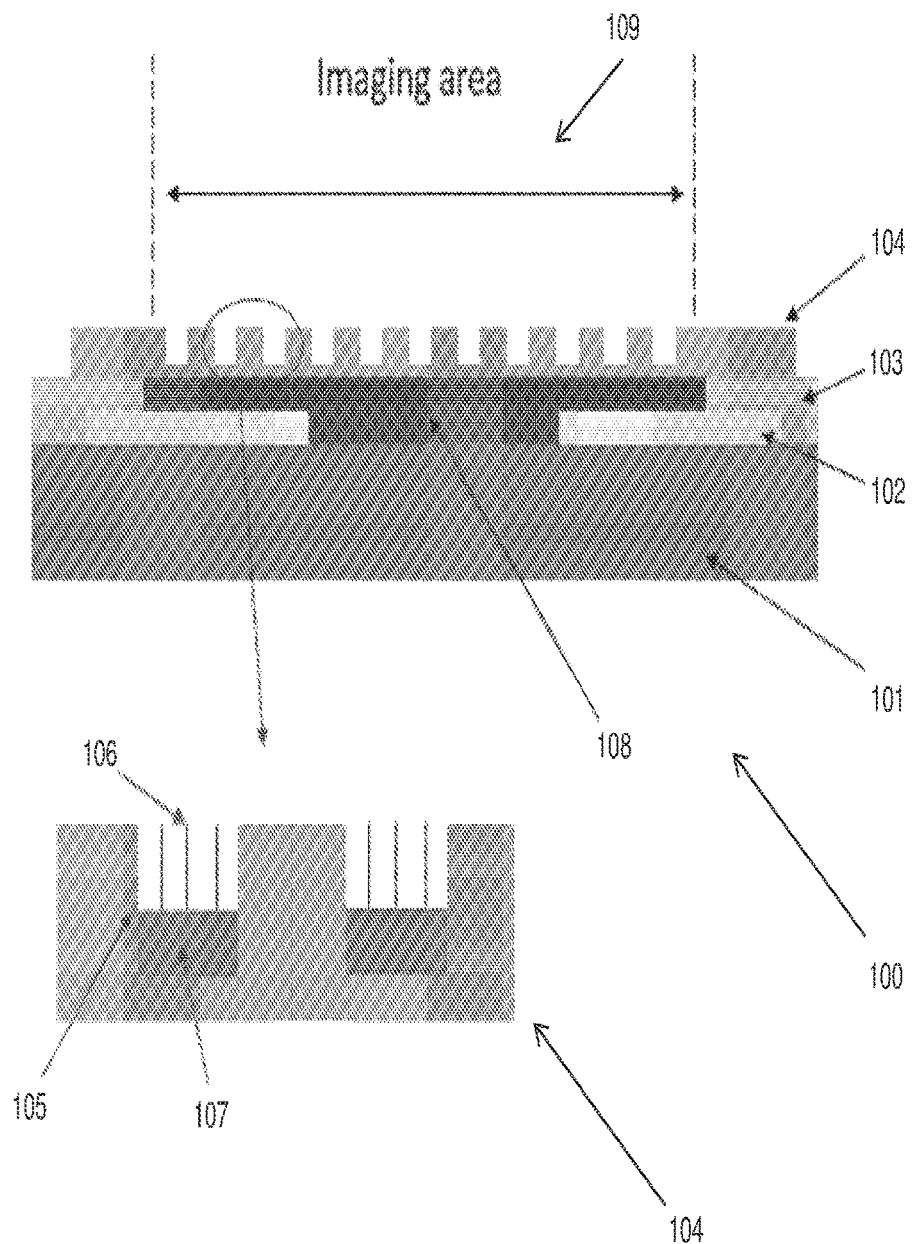
FIG. 9 is a schematic of an example fluidic device for optical transparent electrothermal mixing.

As shown in FIG. 9, an example fluidic device for optical transparent electrothermal mixing comprises a flow cell 100, wherein the flow cell comprises a base layer 101. In some examples, the base layer 101 comprises a glass material. In some examples, a transparent conductive layer includes transparent conductive electrodes 102 that are deposited over at least a portion of the base layer 101. In some examples, the transparent conductive electrodes 102 comprise a material with a resistivity higher than that of metals or conductive inks. In some examples, the transparent conductive electrodes 102 comprise at least one of ITO or silver nanowires. In some examples, the thickness of the transparent conductive layer 102 is in the range of about 20 nm to about 1 µm. If the thickness of the transparent conductive layer 102 exceeds about 1 µm, transparency may be reduced such that the optical transparent electrothermal mixing may be reduced or impaired. However, if the thickness of the transparent conductive layer 102 is lower than about 20 nm, conductivity may be reduced. In some examples, the thickness of the transparent conductive layer 102 is about 60 nm. In some examples, the flow cell 100 further comprises a highly conductive layer 103 deposited over at least a portion of the transparent conductive electrodes 102. In some examples, the highly conductive layer 103 comprises a metal or a conductive ink. In some examples, a nanowell layer 104, serving as the active surface of the flow cell 100 and comprising a plurality of nanowells 105, is deposited over at least a portion of the transparent conductive electrodes 102 and the highly conductive layer 103. In some examples, the nanowells are defined by recesses within the nanowell layer 104, wherein each recess receives an analyte, such as DNA 106, through or embedded within a hydrogel layer 107. In some examples the hydrogel comprises PAZAM. While a nanowell layer 104 is described in reference to the present example, other active surface layers, such as a planar surface layer, can be utilized. In some examples, an index matching layer 108 is positioned between the transparent conductive electrodes 102. In some examples, the index matching layer 108 between the transparent conductive electrodes 102 extends over at least a portion of a top surface of the transparent conductive electrodes 102, such that at least a portion of the index matching layer 108 is positioned between the transparent conductive electrodes 102 and the nanowell layer 104. In some examples, the layers of the flow cell 100 are arranged such that the transparent conductive electrodes 102 are only present in an imaging area 109 of the flow cell 100 and the highly conductive layer 103 is positioned outside of the imaging area 109.

As the electrodes are deposited, they introduce a topology that will be transmitted to the layers that are deposited on top of the electrodes. The sequencing surface, which may be a flat surface, a nanowell imprinted surface, or a surface with other features, may be desirable to be as flat as possible for optimal optical readout of the cluster fluorescent signal. For that purpose, an insulating material may be deposited as the index matching layer 108 uniformly on the patterned electrodes and their substrate with a thickness higher than the thickness of the electrodes. In some examples, the insulating material is $SiO_2$, $Si_3N_4$, $Ta_2O_5$. This insulating material may then be planarized or polished such that only a thin layer (i.e. a few 10's of nanometers) remains in the areas above the electrodes. That remaining thickness may be calibrated to reduce or prevent possible electrical breakdown of the stack between the electrode and the fluid in the flow channel.

Figure 10:
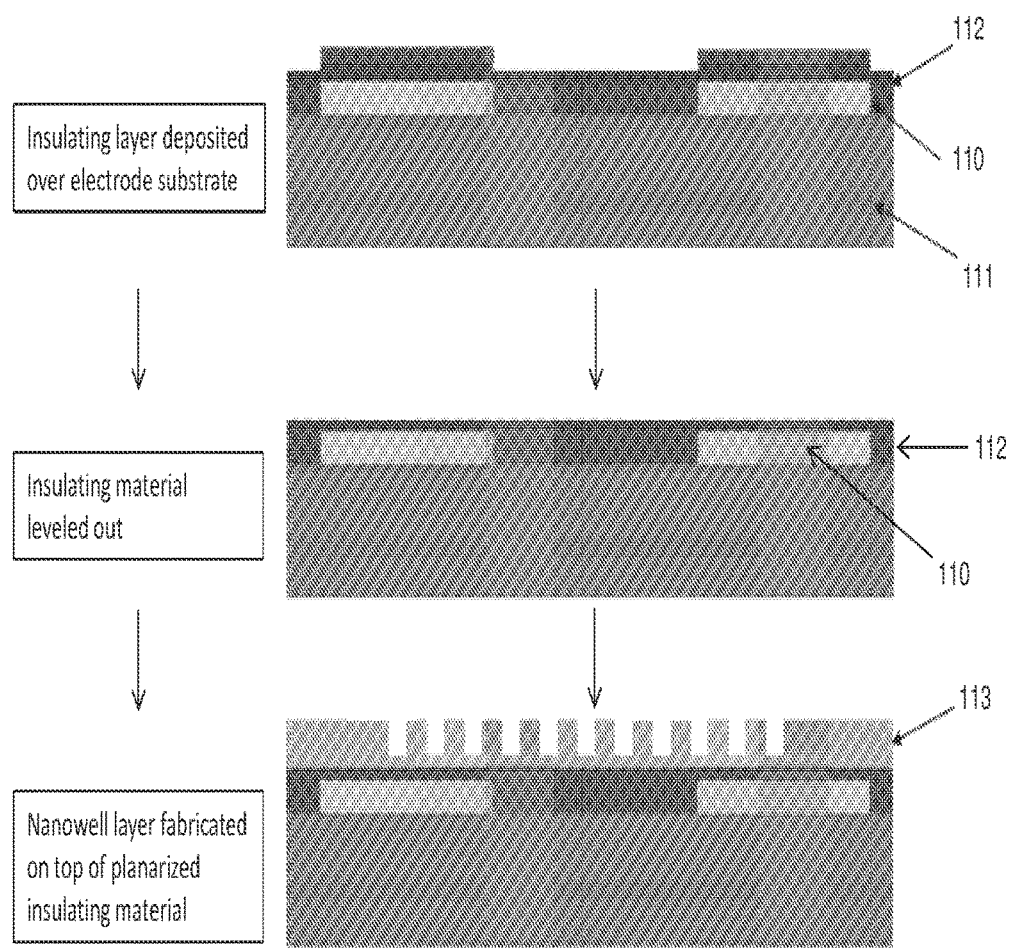
FIG. 10 is a flow chart and accompanying schematic cross-sectional views of an example process for creating a planarized nanowell layer over electrodes.

FIG. 10 shows a fabrication process for providing a planar nanowell layer while integrating electrodes into a flow cell.

First, electrodes 110 are deposited onto a substrate material 111, and an insulating material 112 is deposited onto the electrode substrate. Next, the layer of insulating material 112 is leveled out, such that the electrodes 110 remain embedded in it. Finally, a nanowell layer 113 is fabricated on top of the planarized insulating material 112.

Figure 11A:
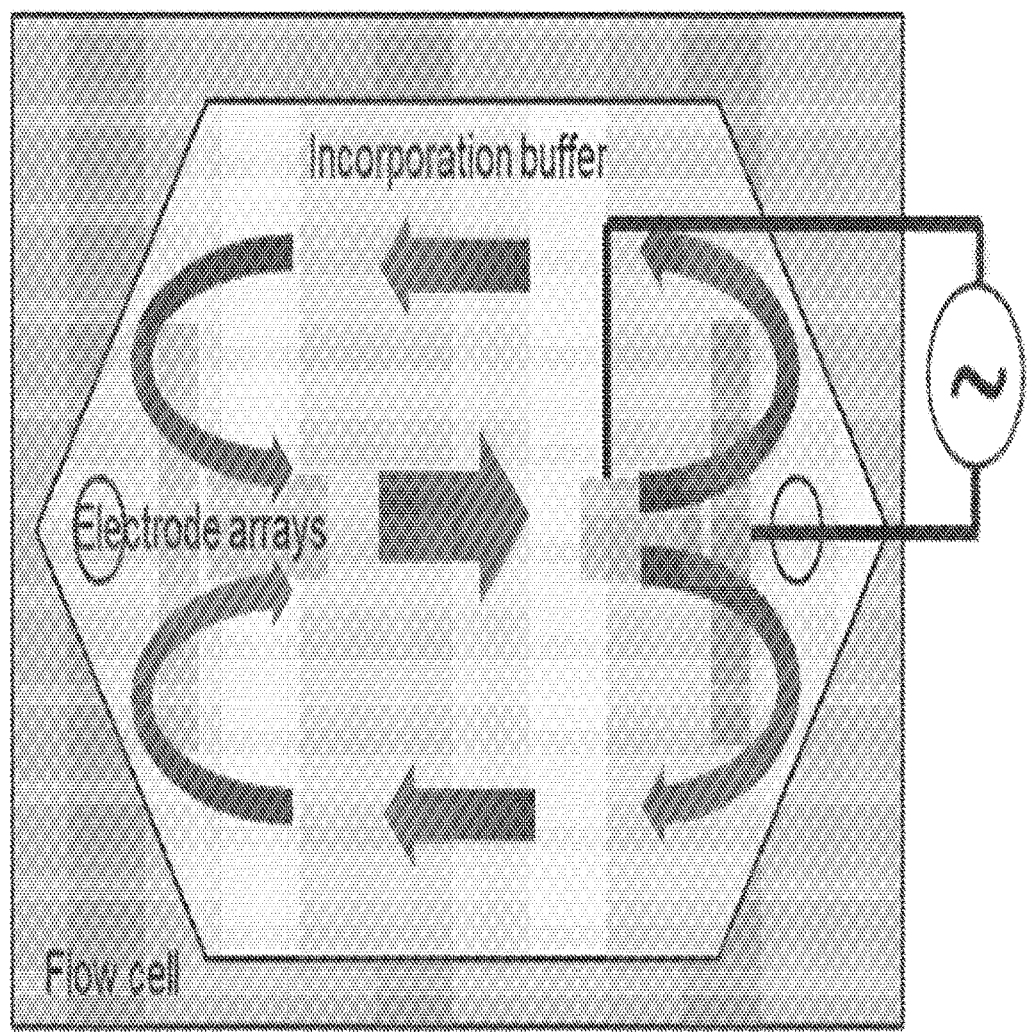
FIGS. 11A and 11B are schematics of example asymmetrical electrode arrays that create electrothermal pumps within a fluidic device.

These mechanisms for electrothermal mixing can be extended to create electrothermal pumps for net translation of fluid in a flow cell. As shown in FIG. 11A, which displays an asymmetric electrode array, this can enable recirculation of fluids at high speeds in a flow cell which can also facilitate transport of reagents to the surface. Variants of such asymmetric electrode arrays may also be used for pumping fluids unidirectionally in and out of a flow cell.

Figure 11B:
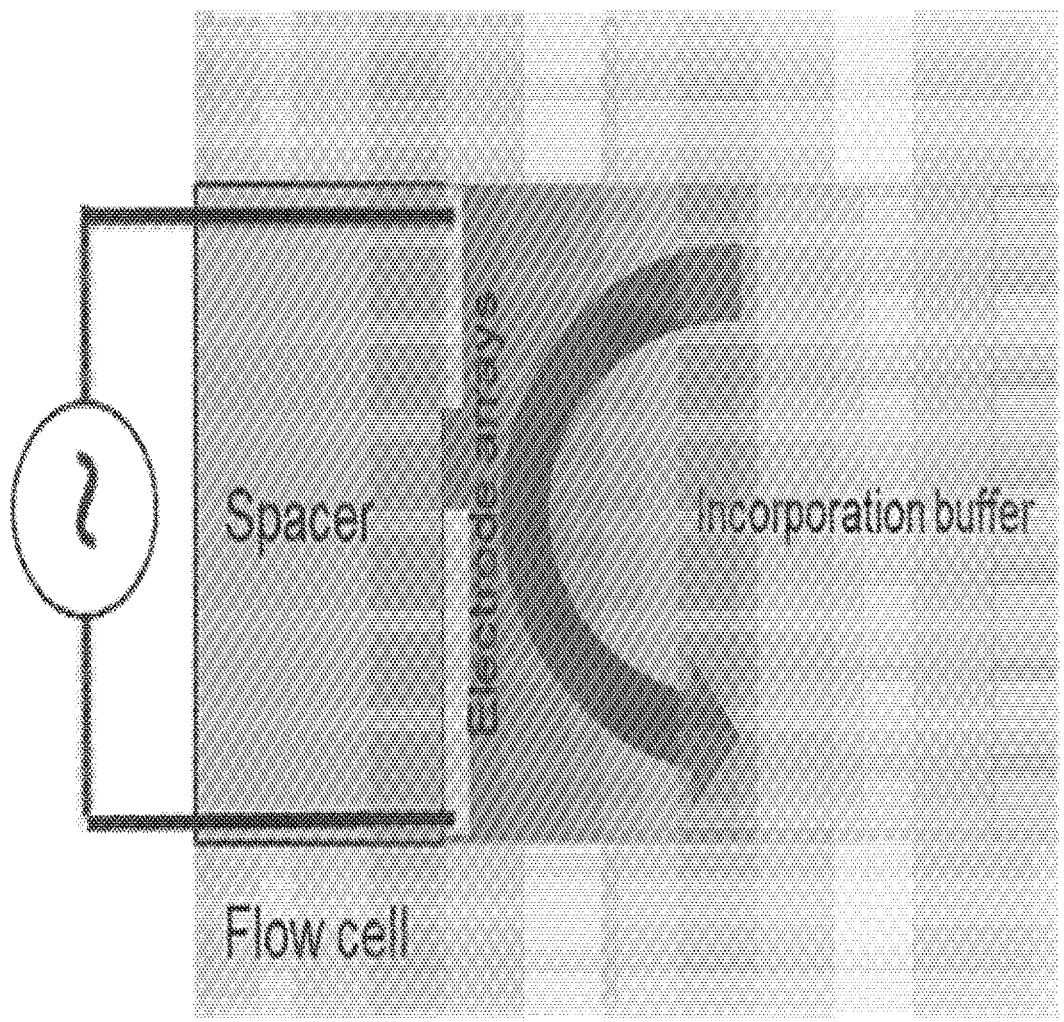

As shown in FIG. 11B, other geometries may be used, in which such electrode pump structures on nanoposts or on the walls of the flow cell drive fluid flow directly to the surface. Electrodes in the walls can be built with multi-layer laminates with buried electrodes or by the use of conductive adhesive layers. Fluid flows, as in FIG. 11B, can help with increasing the efficiency of reagent exchange with a low flush factor. These structures (as shown in FIGS. 11A and 11B) could all contribute to reducing reagent consumption and reagent costs.

Active Mechanical Mixing in a Flow Cell

In addition to, or in lieu of, electrothermal mixing configurations described above, active mechanical mixing structures and mechanical pumping can be utilized to increase the flow rate of the reagents to be employed to drive transport and reagent exchange within a microfluidic device.

Figure 12A:
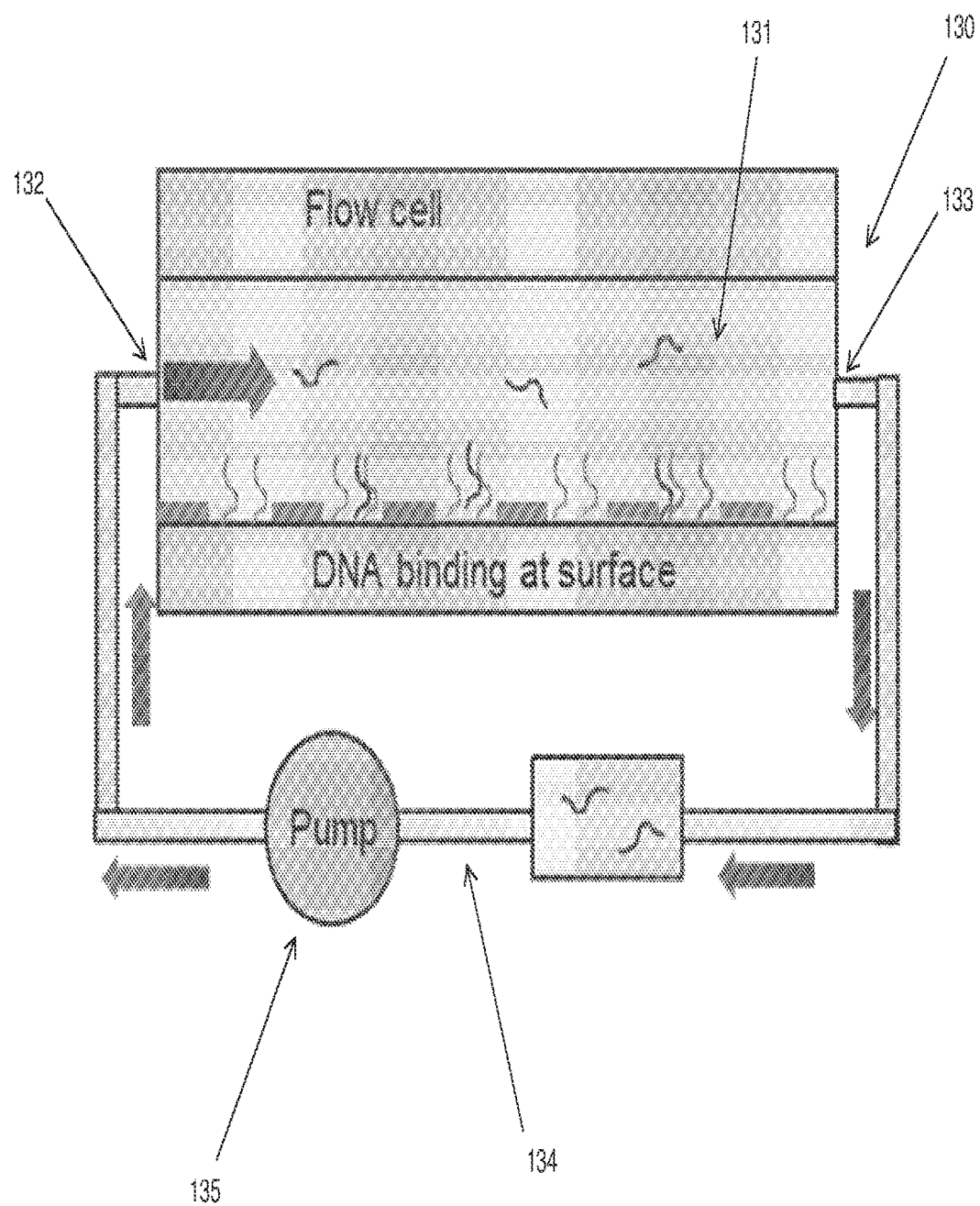
FIG. 12A is a schematic of an example fluidic device comprising active mechanical mixing.

As shown in FIG. 12A, an example fluidic device comprises a flow cell 130 with a flow channel 131 to receive an aqueous solution comprising various constituents (e.g., reagents, buffer, reaction media), which will undergo one or more fluid operations (e.g., mixing, processing, reaction, detection). In some examples, the flow channel 131 has a height in the range of about 20 µm to about 400 µm. In some examples, the flow channel 131 has a height of about 50-100 µm.

The flow cell 130 further comprises at least one inlet 132 and at least one outlet 133, wherein the at least one outlet 133 from the flow cell 130 is looped back to the at least one inlet 132 through an external recirculation loop 134. In some examples, the recirculation loop 134 comprises a pump 135 to pump the reagents back into the flow cell 130 at increased speeds.

When applied to a fluidic device for the process of DNA hybridization, the higher flow rates of the reagents may increase the amount of DNA bound at an active nanowell surface of the flow cell compared to a passive process. The magnitude of the rate of amounts of DNA bound at the active nanowell or other surface feature of the flow channel 131 may depend upon the flow rate and the flow cell type—patterned or unpatterned. The rate of increase may be about 300% for an unpatterned surface flow cell and about 20% for patterned nanowell surfaces. Further increases in the rate of amounts of DNA bound at active nanowells or other surface features can be achieved. There are a few underlying mechanisms that may explain this effect. Increased flow rates drive contact with a larger volume of fresh reagents. In addition, the higher pressure associated with the high flow rates can compress the hydrogel within the nanowells and thereby shorten the distance of diffusion for the reagents through the hydrogel.

Figure 12B:
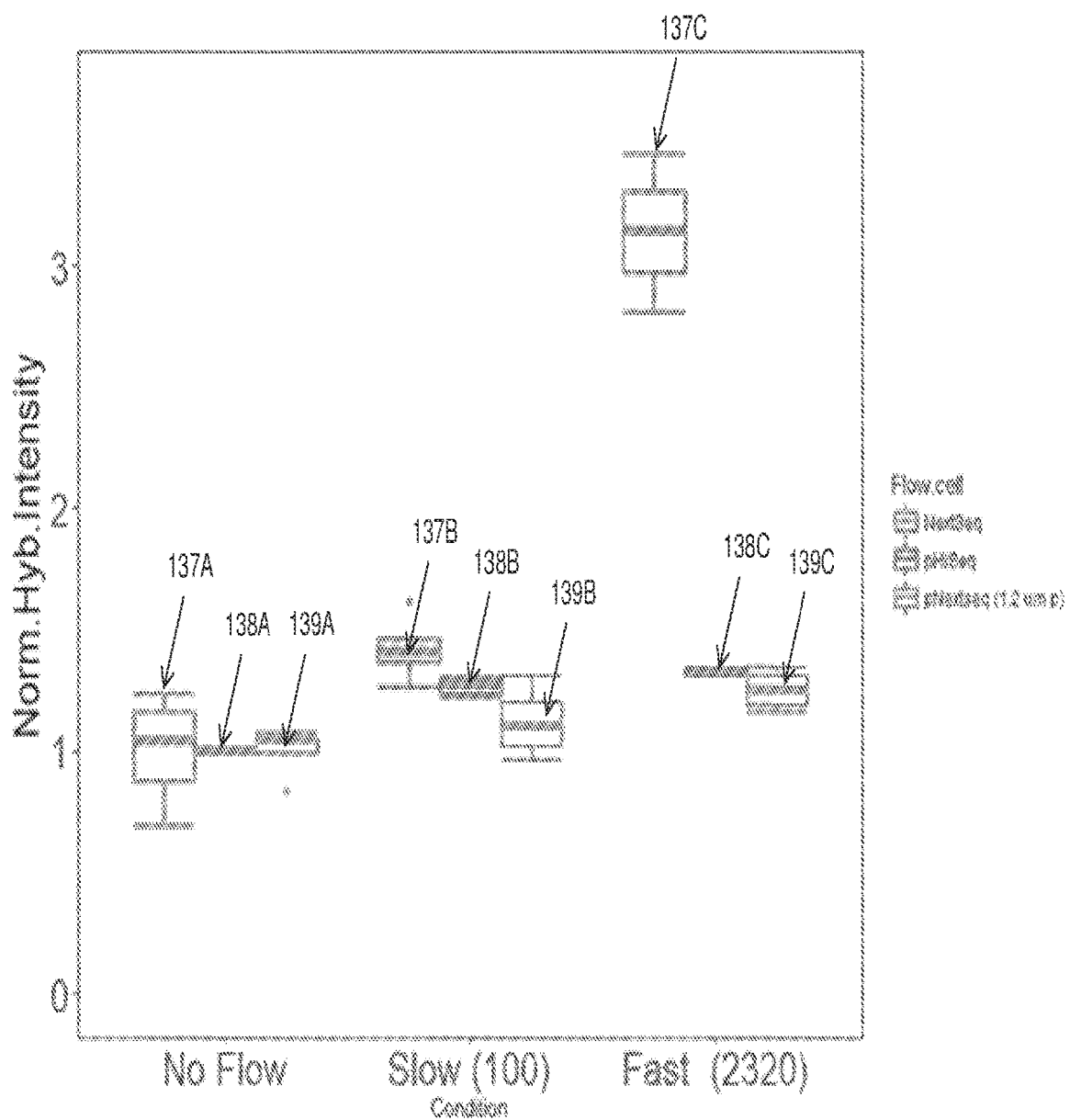
FIG. 12B is a graph showing the hybridization intensities for three types of flow cells with varying reagent recirculation rates.

These results indicate that continuous flow or recirculation may increase the efficiency of the DNA hybridization process. This recirculation can be achieved using an external loop and pump, as in FIG. 12A, or by using a micropump embedded within the flow cell, such as with the electrothermal pumps discussed in FIGS. 11A and 11B. FIG. 12B shows a summary of the enhancement of DNA hybridization across different flow cells when tested at recirculation rates of 0, 100 µl/min, and 2320 µl/min with a total reaction time of 30 seconds. The hybridization was enhanced for all flow cells with high flow rates. An unpatterned flow cell, 137A-137C, showed the largest increase, with 300% increase over passive hybridization at a fast recirculation rate. In addition, the continuous flow of fresh reagents may further reduce reaction cycle times. This technique may be extended to other reactions in clinical application workflows, such as library preparation (e.g., mixing of DNA and active tagmentation), sample enrichment (e.g., active capture, washing, and mixing), cleave, and seeding and clustering.

In some examples, active mechanical mixing within a flow cell can be accomplished through additional mechanisms, such as magnetic mixers (e.g., a device that employs a rotating magnetic field to cause a magnetic stir bar with an aqueous solution to rotate rapidly, resulting in stirring of the aqueous solution), pressure perturbations (e.g. a device that induces pressure gradient, such so as to create changes in fluid movement), and/or bioinspired artificial cilia which may be used to drive chaotic mixing flows. These active mechanical mixing mechanisms may also be used to drive reactions in clinical applications.

Figure 13:
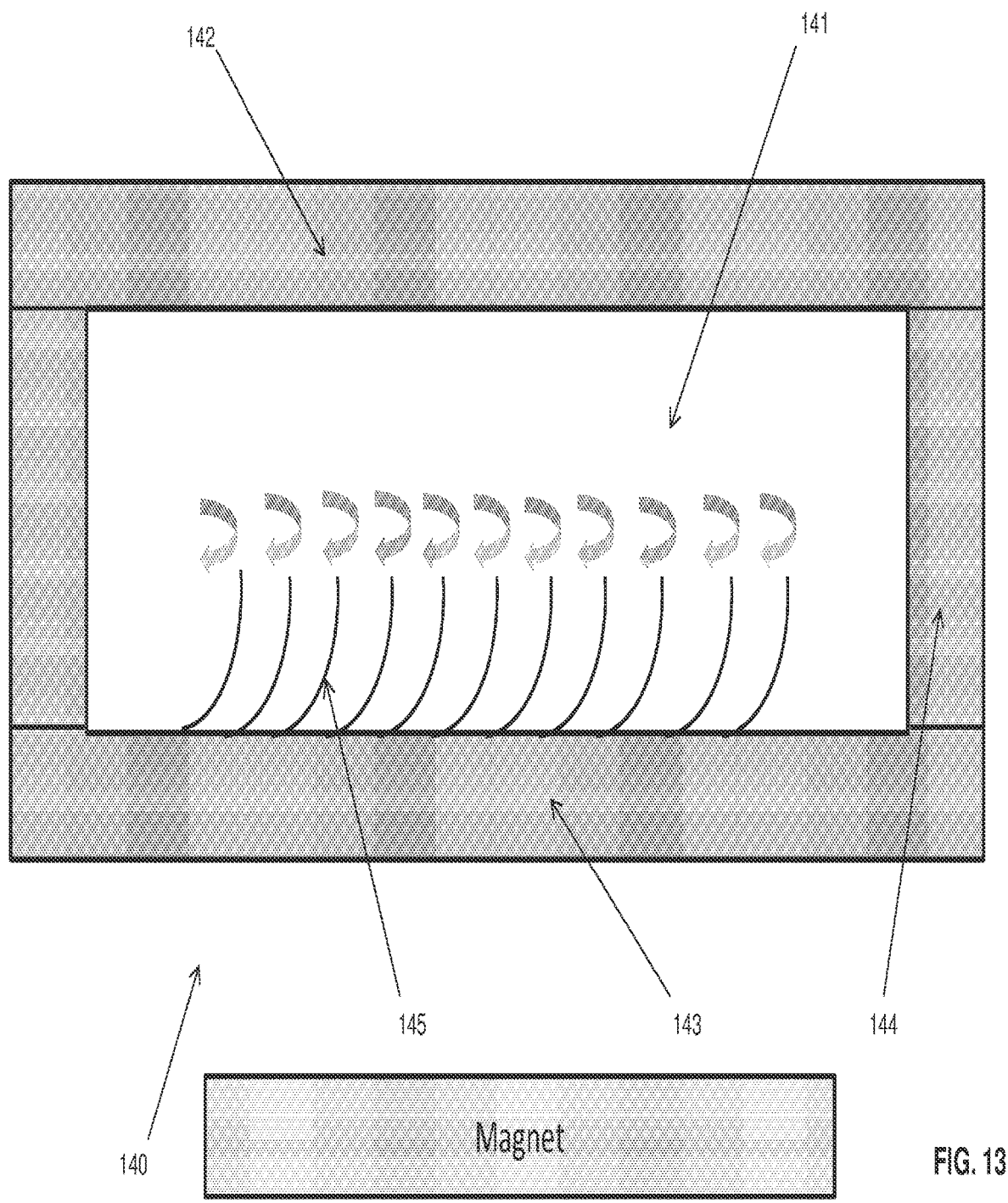
FIG. 13 is a schematic of an example fluidic device comprising another implementation of active mechanical mixing.

As shown in FIG. 13, an example fluidic device comprises a flow cell 140 with a flow channel 141 to receive an aqueous solution comprising various constituents (e.g., reagents, buffer, reaction media), which will undergo one or more fluid operations (e.g., mixing, processing, reaction, detection). In some examples, the flow channel 141 has a height of about 50-100 µm. In some examples, the flow cell 140 further comprises a lid 142, extending over the flow channel 141, and a base 143, extending beneath the flow channel 141. In some examples, the flow cell 140 further comprises side walls and/or spacers 144 within the flow channel 141. In some examples, the flow cell 140 further comprises cilia micromixers 145 on an inside surface of the flow channel 141, which rotate to drive circulation of the aqueous solution within the flow channel 141. In some examples, rotation of the cilia micromixers 145 is achieved via a magnetic field applied by an external magnet. In some examples, cilia mechanical mixing may create homogeneity across the flow channel 141 at a rate of about 100 times to about 150 times faster than pure passive diffusion.

In some examples, the cilia micromixers are provided directly on the active surface, or sequencing surface, of the flow cell. In some examples, a layer of cilia micromixers on the active surface of the flow cell will be arranged with large gaps or openings between clusters of cilia micromixers, to accommodate other structures such as DNA clusters. In some examples, the cilia micromixers are provided on PAZAM-coated surface of the flow cell. In some examples, the cilia micromixers are bonded to a surface of the flow cell through the use of an additional adhesive, such as an epoxy, and/or through additional fasteners, such as clips.

Figure 14:
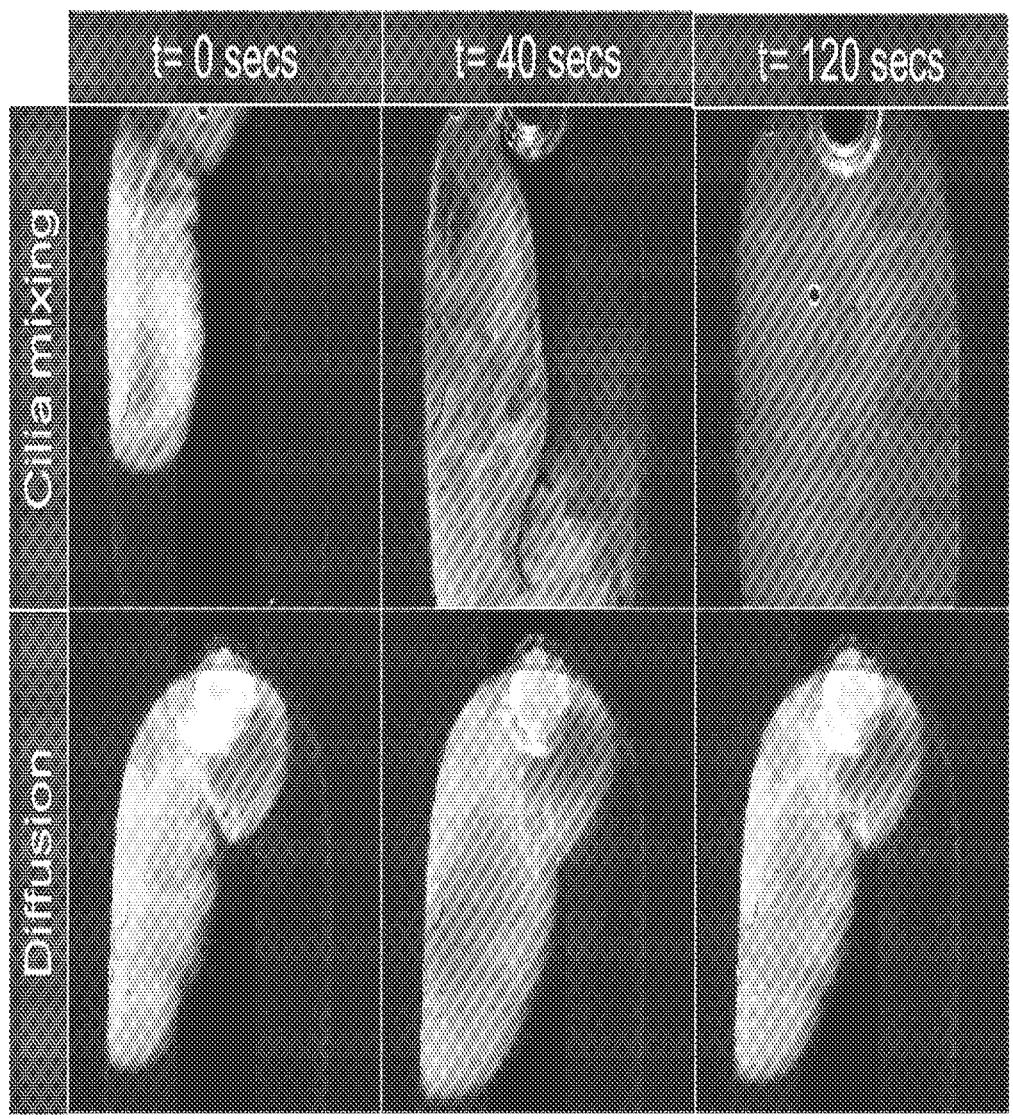
FIG. 14 is an imaging of dye distribution within a flow cell comprising active cilia mixing compared to a flow cell with passive diffusion.

FIG. 14 shows a progression of dye distribution in the flow cell after initial introduction of a dye in a corner of the flow cell with a pipette. The top panel shows the dye distribution at various time intervals of active mixing across the flow cell driven by ciliary rotation, and the bottom panel shows passive diffusion at the same time intervals. These results indicate that cilia mixing can create homogeneity across the aqueous solution within the flow cell at accelerated rates as compared to passive diffusion.

Figure 15:
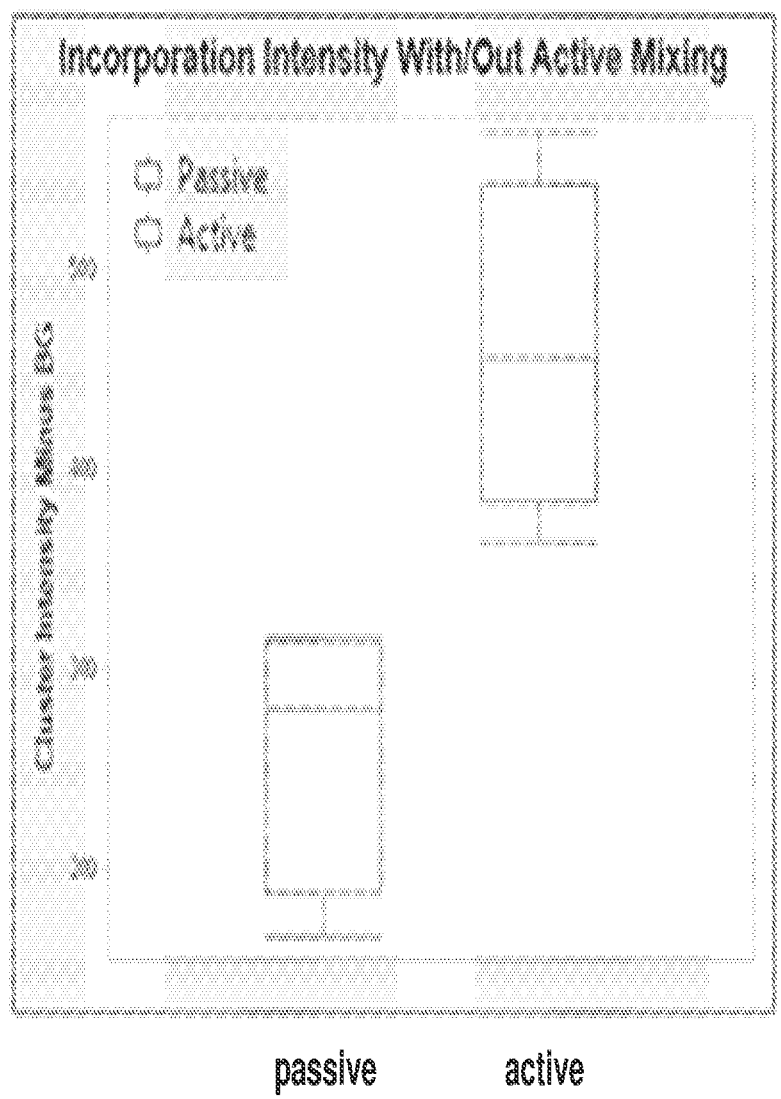
FIG. 15 is a graph showing incorporation intensity within a flow cell with active cilia micromixers, as compared to a flow cell without cilia.

FIG. 15 shows the effect of using cilia micromixers to drive incorporation in a 5×10 mm flow cell, where the rate of incorporation was increased by about 150% as compared to passive diffusion. This enhanced effect is due to the mechanical mixing that occurs via the cilia micromixers.

Passive Mechanical Mixing in a Flow Cell

Figure 23:
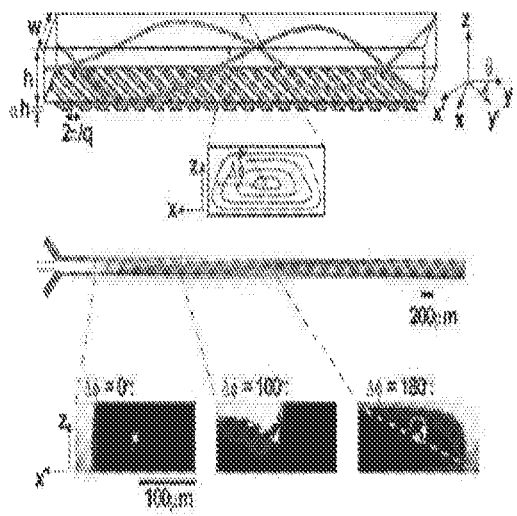
FIG. 23 is a group of schematics of example passive mechanical mixers.
Figure 23:
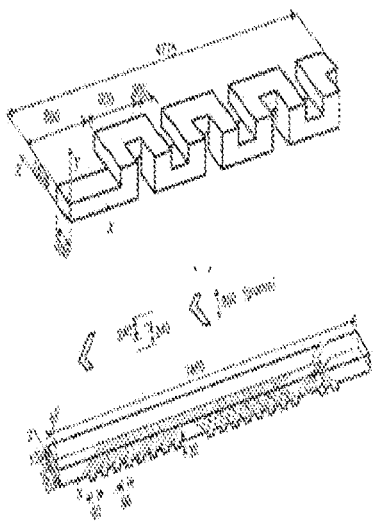
Figure 23:
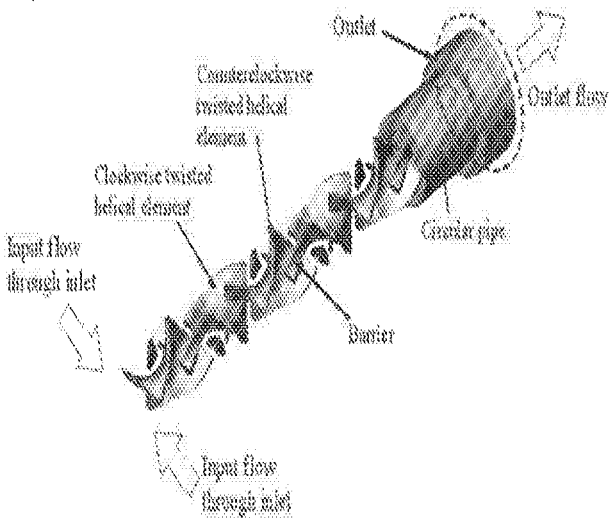

In some examples, mixing within the flow cell may be enhanced through the use of passive mechanical mixers, either individually or in combination with any of the mixing methods disclosed herein. The passive mechanical mixing mechanisms may include various channel geometries and flow cell designs to drive mixing flows. In some examples, the passive mechanical mixers may comprise flow channels having at least one of the following: geometrical lamination, zigzag channels, 3D serpentine structures, embedded barriers, twisted channels, and surface chemistry obstacles. In some examples, the passive mechanical mixer is a geometric lamination, wherein the geometric lamination comprises wedged-shaped flow channel inlets or a 90° rotation curve in the flow channel. In some examples, the passive mechanical mixer is a zigzag channel, wherein the zigzag channel comprises flow splitting in a planar design using elliptic-shaped barriers in the center of the channel. In some examples, the passive mechanical mixer is a 3D serpentine structure, wherein the 3D serpentine structure comprises at least one of: a folding structure; a creeping structure; a stacked shim structure; a helical structure; a spiral structure; and multiple splitting, stretching, and recombining flows. In some examples, the passive mechanical mixer is an embedded barrier within the flow channel, wherein the embedded barrier comprises at least one of a static mixer and/or multidirectional vortices. In some examples, the passive mechanical mixer is a twisted channel, wherein the twisted channel comprises a split-and-recombine structure. In some examples, the passive mechanical mixer is a surface-chemistry mixer, wherein the surface-chemistry mixer comprises an obstacle shape, such as ridges on a surface, or a T- or Y-shaped mixer. In some examples, the passive mechanical mixer is a combination of in- and out-of-plane flows, or a combination of the passive mixers set forth above. FIG. 23 shows examples of some of the above passive mechanical mixers which may be used in the fluidic device.

Acoustic/Vibrational Mixing in a Flow Cell

In acoustic or vibrational mixing, sound energy or other vibrational energy is transferred to a fluid within a fluidic device. Acoustic or vibrational mixing may be implemented for a flow cell in addition to or in lieu of the foregoing electrothermal mixing, active mechanical mixing, and/or passive mechanical mixing method described herein. Inertial nonlinearity of the fluid can rectify oscillatory fluid motion to give a time averaged steady flow. The acoustic fluidic streaming inside a flow cell may be used to drive mixing, and thereby accelerate reactions at the active surface of the flow cell. In some examples, acoustic or vibrational mixing of the fluid may be achieved through the use of an acoustic actuator or other vibrational actuator placed outside of the flow cell or incorporated in the flow cell and proximate to the flow channel. To overcome the challenge of ensuring a secure coupling of the acoustic actuator to the flow cell, bonding and adhesives were also optimized.

Figure 16:
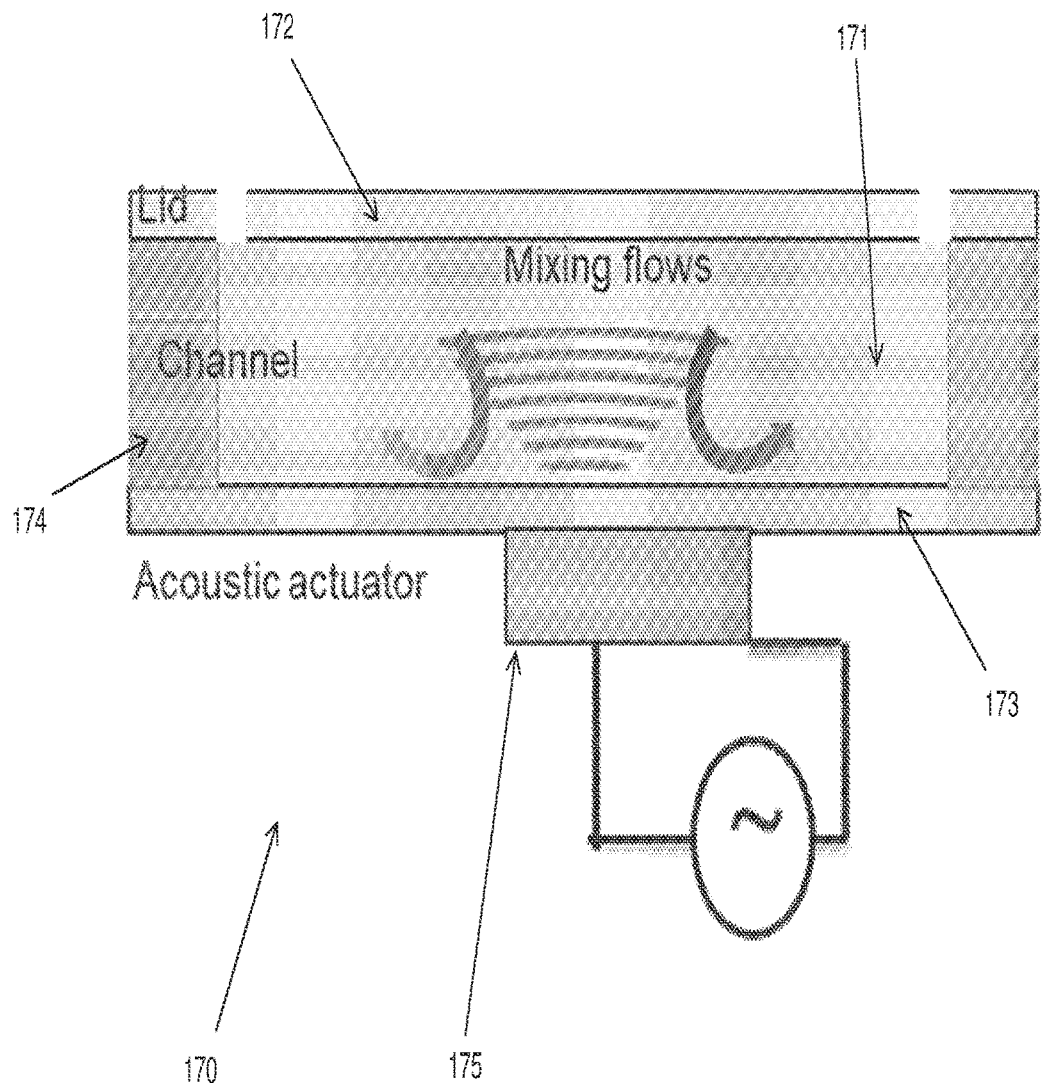
FIG. 16 is a schematic of an example fluidic device comprising active vibrational mixing, such as through acoustic vibrations.

As shown in FIG. 16, an example fluidic device comprises a flow cell 170, wherein the flow cell 170 comprises a flow channel 171 to receive an aqueous solution comprising various constituents (e.g., reagents, buffer, reaction media), which will undergo one or more fluid operations (e.g., mixing, processing, reaction, detection). In some examples, the flow channel 171 has a height in the range of about 20 µm to about 400 µm. In some examples, the flow channel 171 has a height of about 50-100 µm. The fluidic device further comprises a lid 172 extending over the flow channel 171 and a base 173 extending beneath the flow channel 171. In various examples, the flow cell 170 further comprises side walls or spacers 174 within the flow channel 171, wherein the height of the side walls or spacers 174 equals the height of the flow channel 171. In some examples, an acoustic or vibrational actuator 175 is placed on an outside wall of the flow cell 170. In other examples, the acoustic actuator 175 or a portion thereof can be incorporated into a portion of the flow cell 170, such as into the base 173 or the lid 172. In some examples, the acoustic actuator 175 is a piezoelectric transducer, wherein the piezoelectric transducer is operated at an ultrasonic frequency of about 20 KHz or greater to ensure maximum transfer of energy. The crystals in the piezoelectric transducer contract and expand in response to an applied high frequency field and thus serve as an ultrasonic actuator. In some examples, the acoustic actuator 175 is a linear resonant actuator, wherein the linear resonant actuator is operated at an ultrasonic frequency of about 200 Hz. The linear resonant actuator has an electromagnetically driven mass and spring system which is used to drive vibrations, creating oscillatory fluid motion within the flow channel 171.

Figure 17:
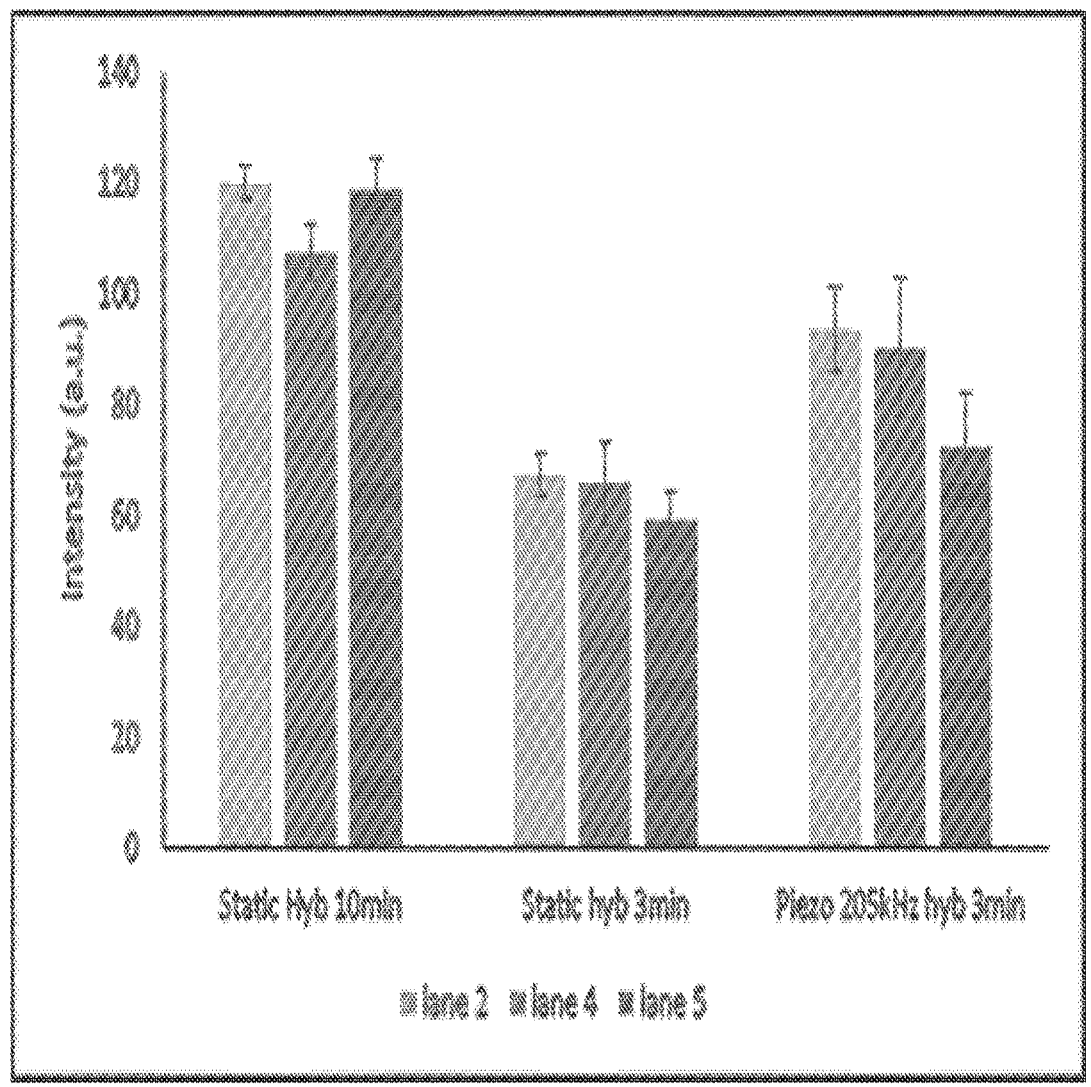
FIG. 17 is a graph showing hybridization intensities for a flow cell with vibrational mixing compared to flow cells with passive hybridization.

In some examples, the piezoelectric transducer may drive strong flows in the flow cell, achieving speeds exceeding 100 microns/sec. The velocities and the flow patterns are sensitive to the frequency of operation and the voltage at which the piezoelectric transducer is driven. In some examples, the piezoelectric transducer may be used to accelerate the DNA hybridization reaction at an active surface of the flow cell. FIG. 17 shows that piezoelectric-driven acoustic mixing for 3 minutes at 205 KHz significantly enhances DNA hybridization at the active surface of a flow cell compared to passive mixing for 3 minutes, and approaches the intensities attained over 10 minutes of passive hybridization.

Linear Resonant Actuators ("LRAs") have traditionally not been considered for driving acoustic mixing, and by themselves are unable to drive fluid streaming through a glass flow cell. However, soft materials, such as a Kapton spacer, may be arranged within the flow channel and serve to transduce the energy from the LRA to enable flow streams in the aqueous solution. With such a soft material positioned within the flow channel, flow rates exceeding 5 mm/sec may be achieved. This was an unexpected and potentially powerful finding, as it provides a low cost path to drive mixing in flow cells and because LRA modules may be applied externally to a pre-existing flow cell without much modification.

Figure 18A:
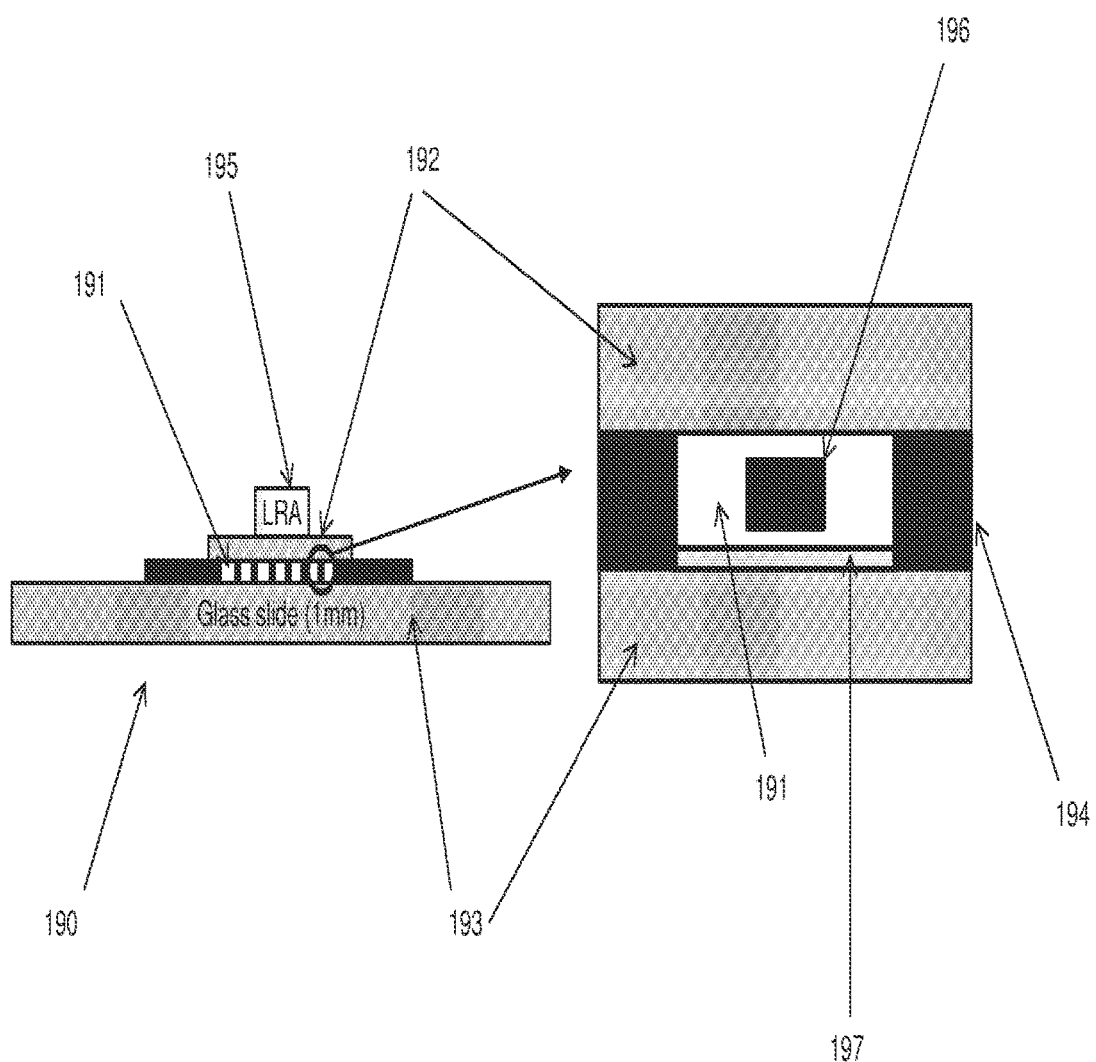
FIG. 18A is a schematic of an example fluidic device comprising active acoustic mixing.

As shown in FIG. 18A, an example fluidic device comprises a flow cell 190 with a flow channel 191 to receive an aqueous solution comprising various constituents (e.g., reagents, buffer, reaction media), which will undergo one or more fluid operations (e.g., mixing, processing, reaction, detection). In some examples, the flow channel 191 has a height in the range of about 20 µm to about 400 µm. In some examples, the flow channel 191 has a height of about 50-100 µm. The flow cell 190 further comprises a lid 192 extending over the flow channel 191 and a base 193 extending beneath the flow channel 191. In some examples, the lid 192 and/or the base 193 comprise a glass material. In some examples, the flow cell 190 further comprises side walls or spacers 194 within the flow channel 191. In some examples, the flow cell 190 further comprises an acoustic actuator 195 positioned on the outside surface of the flow cell 190, wherein the acoustic actuator 195 is a linear resonant actuator. In some examples, the flow cell 190 further comprises at least one floating structure 196 within the flow channel 191 to transduce the energy, via oscillation, in the linear resonant actuator to enable mixing of the aqueous solution. As shown in FIG. 18A, in some examples, the floating structure 196 may comprise a free-floating structure within the aqueous solution. In some examples, the free-floating structure may have a height in the range of about 10 μm to about 50 μm. In some examples, a plurality of free-floating structures may be positioned within the aqueous solution in the flow channel 191. In some examples, the plurality of free-floating structures comprises at least 2 free-floating structures and less than about 20 free-floating structures. In some examples, the plurality of free-floating structures are separated from one another by a gap of about 1 mm. In some examples, the flow cell 190 further comprises an active surface 197 as a sequencing area within the flow channel 191. In some examples, the floating structure 196 may be positioned within sequencing lanes in the flow channel 191.

Figure 18B:
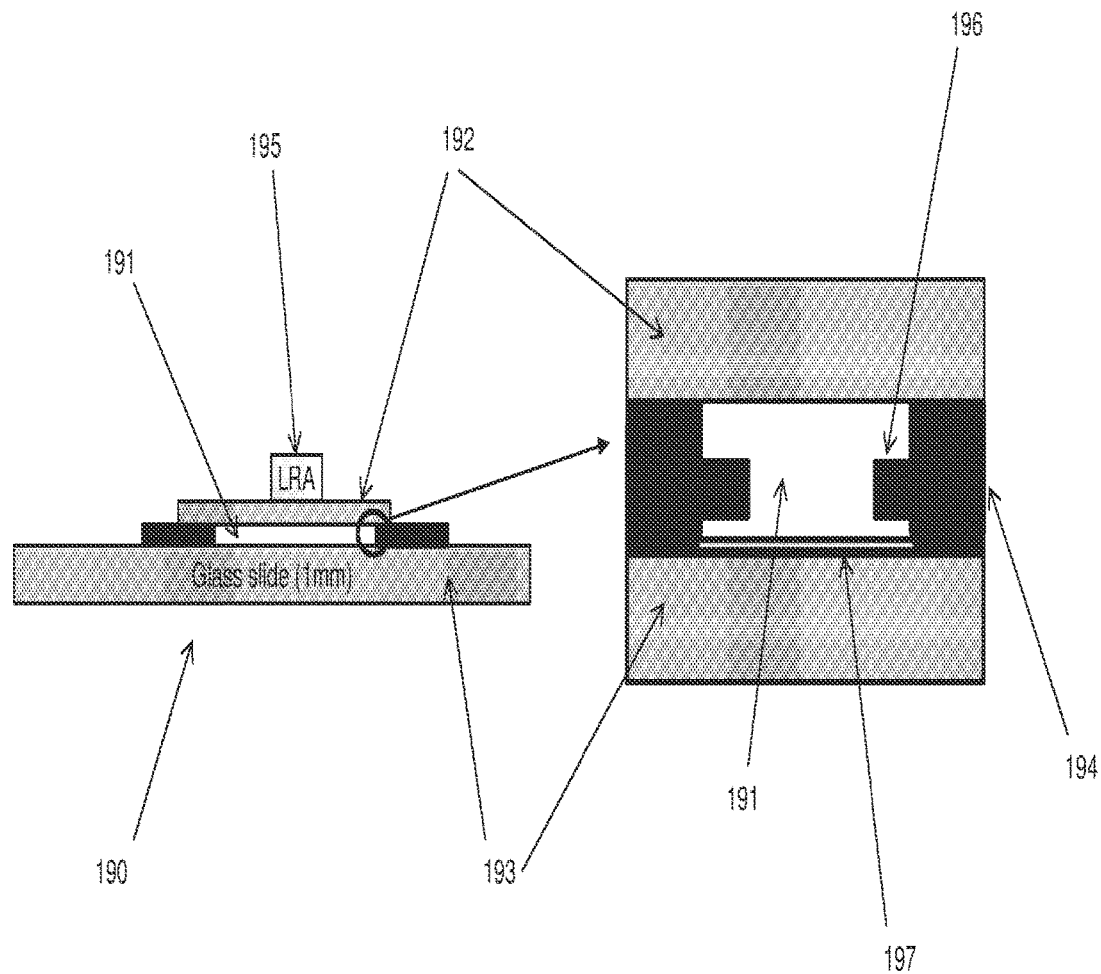
FIG. 18B is a schematic of another example fluidic device comprising active acoustic mixing.

As shown in FIG. 18B, the floating structure 196 may instead comprise a secured structure, wherein the secured structure projects from at least one of the side walls and the spacers 194 within the flow channel 191. In some examples, the secured structure may have a height of about 50 μm. In some examples, a plurality of secured structures may project from at least one of the side walls and the spacers 194 within the flow channel 191. In some examples, the secured structure includes a proximal end secured to a side wall of the flow channel 191 and a distal end protruding away from the side wall. In some examples, the distal end of the secured structure oscillates as energy is transduced from the vibrational or acoustic actuator.

Figure 19:
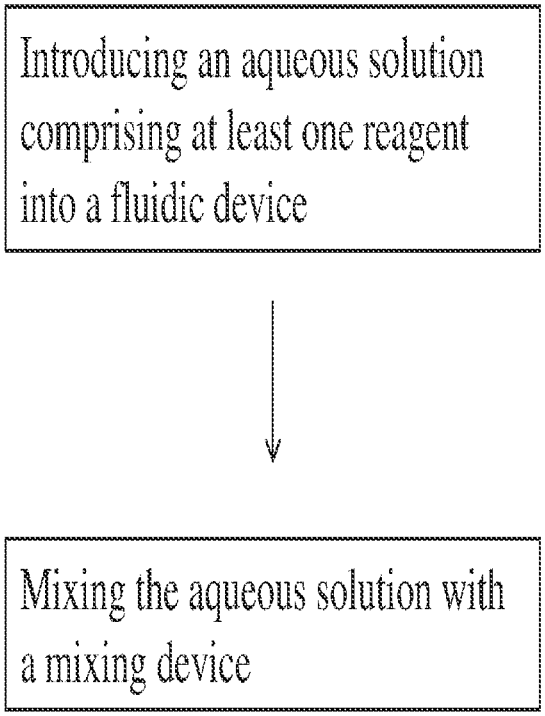
FIG. 19 is a flow chart of an example method of mixing reagents in a fluidic device.

As shown in FIG. 19, an example method of mixing reagents in a fluidic device comprises (i) introducing an aqueous solution comprising at least one reagent into a fluidic device, and (ii) mixing the aqueous solution with a mixing device. In some examples, the fluidic device comprises a flow cell comprising: inlet and outlet ports and a flow channel extending therebetween, the flow channel to receive an aqueous solution comprising at least one reagent; a lid, comprising an inner surface and an outer surface, extending over the flow channel; and a base, comprising an inner surface and an outer surface, extending beneath the flow channel. In some examples, the flow channel has a height of about 50-100 μm. In some examples, the mixing device comprises at least one of an electrothermal mixing device, an active mechanical mixing device, and an acoustic mixing device. In some examples, mixing comprises creating a gradient of conductivity, permittivity, temperature, density, and/or viscosity in the aqueous solution.

Figure 20:
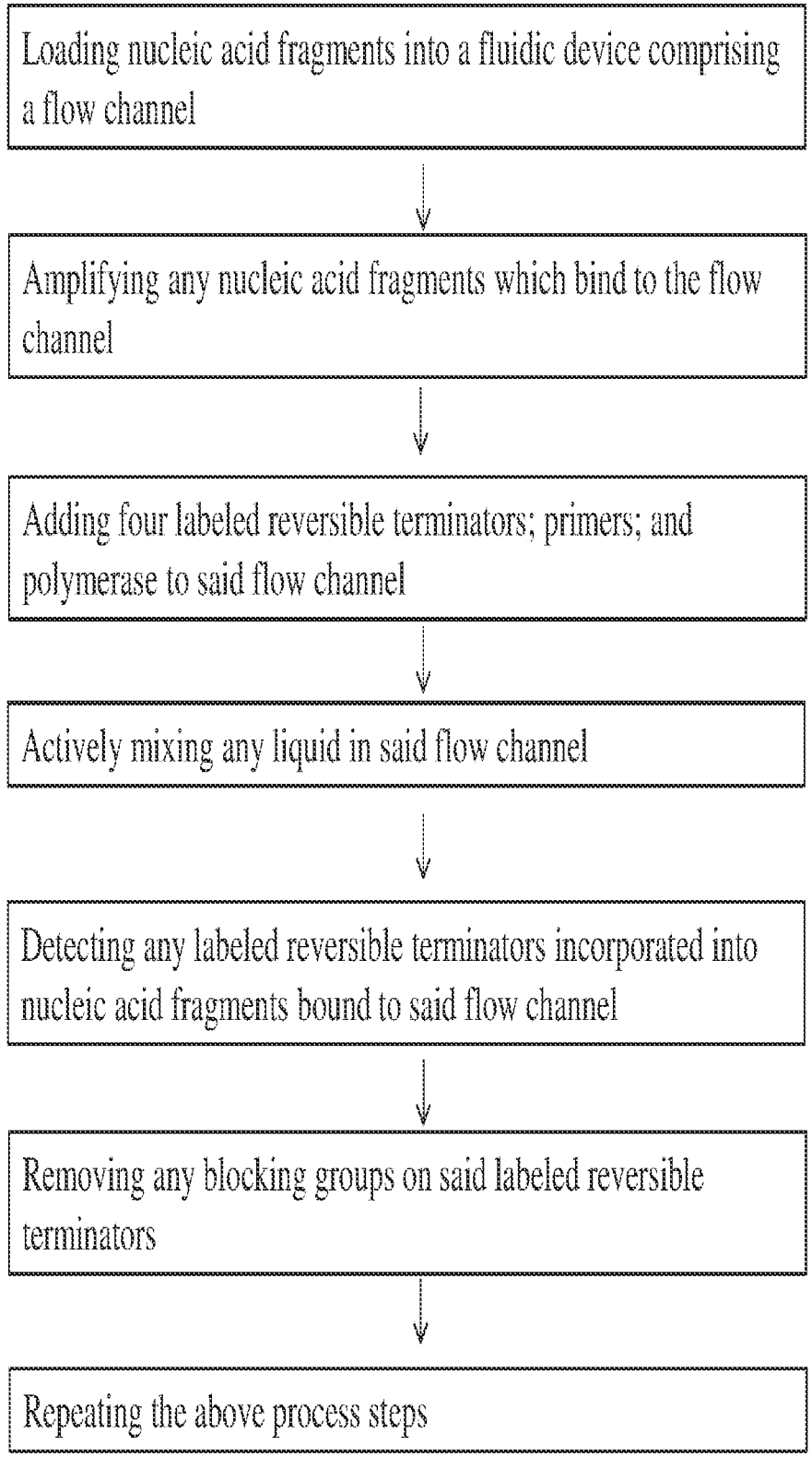
FIG. 20 is a flow chart of an example method for reducing sequencing by synthesis cycle time.

As shown in FIG. 20, an example method for reducing sequencing by synthesis cycle time comprises: loading an analyte of interest (e.g., a nucleic acid or a nucleic acid fragment, which may be amplified) into a microfluidic device, wherein the microfluidic device comprises a flow cell including an inlet port, an outlet port, and at least one flow channel extending between the inlet port and the outlet port, the flow channel to receive the analyte of interest and one or more reagents (e.g., four labeled reversible terminators; primers; and polymerase), and at least one active mixing device coupled to the flow cell and positioned proximate to the at least one flow channel; loading a reagent (e.g., four labeled reversible terminators; primers; and polymerase) into the flow cell; and actively mixing the reagent with the analyte of interest in said flow channel via active mixing by the active mixing device. In some examples, the flow channel has a height in the range of about 20 μm to about 400 μm. In some examples, the flow channel has a height of about 50-200 μm. In some examples, the active mixing device comprises at least one of an electrothermal mixing device, an active mechanical mixing device, and an acoustic or vibrational mixing device. In some examples, the active mixing device is an electrothermal mixing device comprising a passivation layer positioned between the flow channel and an electrode array of the electrothermal mixing device. In some examples, the method further comprises, after actively mixing any liquid within the flow channel, detecting any labeled reversible terminators incorporated into nucleic acid fragments bound to said flow channel; removing any blocking groups on said labeled reversible terminators; and repeating the above described processes.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

While the subject matter of this disclosure has been described and shown in considerable detail with reference to certain illustrative examples, including various combinations and sub-combinations of features, those skilled in the art will readily appreciate other examples and variations and modifications thereof as encompassed within the scope of the present disclosure. Moreover, the descriptions of such examples, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claim.

The invention claimed is:

1. A method comprising:
   loading an analyte of interest into a microfluidic device, wherein the microfluidic device comprises:
   a flow cell including an inlet port, an outlet port, and at least one flow channel extending between the inlet port and the outlet port, the flow channel to receive the analyte of interest and one or more reagents; and
   at least one electrothermal mixing device coupled to the flow cell and positioned proximate to the at least one flow channel, the electrothermal mixing device comprising a passivation layer positioned between the flow channel and an electrode array of the electrothermal mixing device, the electrode array embedded within the passivation layer;
   loading a reagent into the flow cell; and
   actively mixing the reagent with the analyte of interest in said flow channel via electrothermal mixing by the electrothermal mixing device.

2. The method of claim 1, wherein the electrode array comprises a plurality of electrodes and wherein the plurality of electrodes are arranged in a coplanar arrangement.

3. The method of claim 2, wherein a first electrode and a second electrode of the plurality of electrodes are separated by a gap, the gap comprising a first distance between the first and second electrodes and a second distance between the first and second electrodes, wherein the first distance and the second distance are different, such that the gap is non-uniform.

4. The method of claim 1, wherein the passivation layer has a thickness of about 20 nm, inclusive, to about 2 μm, inclusive.

5. The method of claim 1, wherein the microfluidic device further comprises an external loop connecting the outlet port back to the inlet port such that fluid within the flow cell is recirculated through the flow cell.

6. The method of claim 5, wherein the external loop further comprises a recirculation pump.

7. A method comprising:
loading an analyte of interest into a microfluidic device, wherein the microfluidic device comprises:
a flow cell including an inlet port, an outlet port, and at least one flow channel extending between the inlet port and the outlet port, the flow channel to receive the analyte of interest and one or more reagents; and
at least one electrothermal mixing device coupled to the flow cell and positioned proximate to the at least one flow channel, the electrothermal mixing device comprising a passivation layer positioned between the flow channel and an electrode array of the electrothermal mixing device, the electrode array comprising a plurality of electrodes;
loading a reagent into the flow cell; and
actively mixing the reagent with the analyte of interest in said flow channel via electrothermal mixing by the electrothermal mixing device, wherein the plurality of electrodes comprises a first crescent-shaped electrode, a second crescent-shaped electrode, and a third central electrode,
wherein the first and second crescent-shaped electrodes each comprise a center portion, a first distal end, and a second distal end,
wherein the first and second crescent-shaped electrodes are arranged concentrically such that the first distal ends are facing one another and are separated by a first opening and the second distal ends are facing one another and are separated by a second opening, and
wherein the third central electrode comprises a substantially circular shape having a first wing portion and a second wing portion extending from opposite sides of the substantially circular shape, the third central electrode positioned between the first and second crescent-shaped electrodes such that the first wing portion extends through the first opening and the second wing portion extends through the second opening.

8. The method of claim 7, wherein the first wing portion is distanced from the first distal end of the first crescent-shaped electrode by a first gap.

9. The method of claim 8, wherein the first wing portion comprises a proximal end connected to the substantially circular shape and a distant end extending away from the substantially circular shape, and wherein a width of the first wing portion increases gradually from the proximal end to the distant end, such that the first gap is non-uniform.

10. A method comprising:
loading an analyte of interest into a microfluidic device, wherein the microfluidic device comprises:
a flow cell including an inlet port, an outlet port, and at least one flow channel extending between the inlet port and the outlet port, the flow channel to receive the analyte of interest and one or more reagents; and
at least one electrothermal mixing device coupled to the flow cell and positioned proximate to the at least one flow channel, the electrothermal mixing device comprising a dielectric material and an electrode array embedded within the dielectric material;
loading a reagent into the flow cell; and
actively mixing the reagent with the analyte of interest in said flow channel via electrothermal mixing by the electrothermal mixing device.

11. The method of claim 10, wherein the dielectric material comprises at least one of: a passivation layer; an index matching layer; a mineral oil; a metal oxide; tantalum oxide ($Ta_2O_5$); silica ($SiO_2$); hydrophilic silica ($SiO_2$); silicon nitride ($Si_3N_4$); a nanoimprint resin; a hydrophobic photoresist; parylene, a soft polymeric material; or an insulating material.

12. The method of claim 10, wherein the electrode array comprises electrodes that extend transversely from the dielectric material.

13. The method of claim 10, wherein the electrode array comprises a plurality of electrodes and wherein the plurality of electrodes are arranged facing each other.

14. The method of claim 10, wherein the flow cell comprises a glass layer having a thickness in the range of about 80 μm, inclusive, to about 1 mm, inclusive, and wherein the electrode array is arranged on a printed circuit board positioned on an outer surface of the flow cell.

15. The method of claim 10, wherein the flow cell further comprises a nanowell layer comprising a plurality of nanowells, the nanowells adapted for the analyte of interest to bind to an interior surface thereof and wherein the electrode array comprises a plurality of transparent electrodes, and wherein a highly conductive material is on a portion of the plurality of transparent electrodes, outside of an imaging area of the flow cell.

16. The method of claim 15, wherein the highly conductive material comprises a metal or conductive ink with a resistivity of about $2\times10^{-8}$ Ω·m, inclusive, to about $5\times10^{-6}$ Ω·m, inclusive.

17. The method of claim 15, wherein the flow cell further comprises a planarization layer on a portion of the plurality of transparent electrodes, within an imaging area of the flow cell.

18. The method of claim 17, wherein the planarization layer is an index matching layer.

19. The method of claim 18, wherein the index matching layer comprises an insulating material.

20. The method of claim 15, wherein a first transparent electrode of the plurality of transparent electrodes has a thickness of about 20 nm, inclusive, to about 1um, inclusive, and a width of about 200 μm, inclusive, to about 800 μm, inclusive.

21. The method of claim 20, wherein the first transparent electrode of the plurality of transparent electrodes is separated from a second transparent electrode of the plurality of transparent electrodes by a gap in the range of about 50 μm, inclusive, to about 750 μm, inclusive.

* * * * *